(12) United States Patent
Sato et al.

(10) Patent No.: US 7,474,977 B2
(45) Date of Patent: Jan. 6, 2009

(54) COMPASS SENSOR UNIT AND PORTABLE ELECTRONIC DEVICE

(75) Inventors: Hideki Sato, Hamamatsu (JP); Yukio Wakui, Iwata (JP); Masayoshi Omura, Hamamatsu (JP)

(73) Assignee: Yamaha Corporation, Shizuoka-ken (JP)

( * ) Notice: Subject to any disclaimer, the term of this patent is extended or adjusted under 35 U.S.C. 154(b) by 0 days.

(21) Appl. No.: 11/948,921

(22) Filed: Nov. 30, 2007

(65) Prior Publication Data
US 2008/0091372 A1    Apr. 17, 2008

Related U.S. Application Data

(62) Division of application No. 11/149,732, filed on Jun. 10, 2005, now Pat. No. 7,324,906.

(30) Foreign Application Priority Data
Jul. 29, 2004    (WO) ................ PCT/JP2004/011191

(51) Int. Cl.
 *G06F 19/00*    (2006.01)
(52) U.S. Cl. ...................... 702/85; 33/356; 342/357.08; 701/224; 702/92
(58) Field of Classification Search ................ 702/85, 702/92–94; 701/220, 224; 33/355 R, 356; 342/357.08; 455/566, 575.1
See application file for complete search history.

(56) References Cited

U.S. PATENT DOCUMENTS

| 6,768,957 | B2 | 7/2004 | Kato |
| 6,946,991 | B2 | 9/2005 | Hasebe et al. |
| 7,028,410 | B2 | 4/2006 | Sato et al. |
| 2003/0013507 | A1 | 1/2003 | Sato |
| 2003/0134665 | A1 | 7/2003 | Kato et al. |
| 2005/0072011 | A1 | 4/2005 | Miyashita et al. |

(Continued)

FOREIGN PATENT DOCUMENTS

EP    1 698 857 A1    9/2006

(Continued)

OTHER PUBLICATIONS

Written Opinion of the International Searching Authority and International Search Report for parent PCT/JP2004/011191.

(Continued)

*Primary Examiner*—John H Le
(74) *Attorney, Agent, or Firm*—Dickstein Shapiro LLP

(57) ABSTRACT

In a compass sensor unit, an azimuth data computing method is carried out by the steps of: inputting a signal from a geomagnetic sensor to measure magnetic field; determining whether to store measurement data of the magnetic field based on a distance from the last stored measurement data; calculating an offset value based on the stored data; making a comparison for each component of a plurality of measurement data used for calculating the offset value, and judging the offset value to be valid when a difference between the maximum and minimum values of each component is a given value or more; updating the already stored offset value to the offset value judged to be valid; and correcting newly provided measurement data by the updated offset value to compute azimuth data.

6 Claims, 13 Drawing Sheets

U.S. PATENT DOCUMENTS

| | | |
|---|---|---|
| 2005/0150122 A1 | 7/2005 | Cho et al. |
| 2005/0256673 A1 | 11/2005 | Hikida et al. |
| 2006/0032064 A1 | 2/2006 | Sato et al. |

FOREIGN PATENT DOCUMENTS

| | | |
|---|---|---|
| JP | 56-006169 | 1/1981 |
| JP | 3-152412 | 6/1991 |
| JP | 8-105745 | 4/1996 |
| JP | 9-133530 | 5/1997 |
| JP | 2003-090726 A1 | 3/2003 |
| JP | 2003-294447 A | 10/2003 |
| JP | 2004-012416 | 1/2004 |
| JP | 2005-249619 A1 | 9/2005 |
| WO | WO-2004/003476 A1 | 1/2004 |
| WO | WO-2005/061990 A1 | 7/2005 |

OTHER PUBLICATIONS

Written opinion of the International Searching Authority and International Search Report for PCT/JP2004/010479.

International Search Report dated Nov. 22, 2005.

COMPASS SENSOR UNIT AND PORTABLE ELECTRONIC DEVICE

CROSS-REFERENCE TO RELATED APPLICATIONS

This application is a divisional of U.S. application Ser. No. 11/149,732, which was filed on Jun. 10, 2005; the entirety of which is incorporated herein by reference.

BACKGROUND OF THE INVENTION

1. Technical Field

The present invention relates to a calibration technique (offset correction technique) of azimuth measurement data in finding an azimuth direction using a geomagnetic sensor. In particular, it relates to an azimuth data computing method, a compass sensor unit, and a portable electronic device, which can perform proper calibration even when measurement data obtained from a three-axis geomagnetic sensor are confined in a peculiar plane, whereby a correct azimuth direction is found.

2. Background Art

There is known a conventional portable terminal, such as a cellular phone set, which is provided with a magnetic sensor for detecting geomagnetism to find a direction based on the geomagnetism detected by the magnetic sensor. The determined azimuth direction is used, for example, to display a map in proper orientation. A new portable terminal has recently appeared on the market, which is provided with a GPS (Global Positioning System) receiver for detecting a position to display a map around its current position in such a manner to orient the map in accordance with the heading of the portable terminal relative to the azimuth direction.

However, since there are extraneous magnetic fields leaked from a loudspeaker, a microphone, a magnetized metallic package for electronic parts, etc. mounted in the portable terminal, a magnetic sensor mounted in the portable terminal detects a mixture of the geomagnetism and other magnetic fields generated from the electronic parts and the like inside the portable terminal. The extraneous magnetic field may cause varying offset in measurement of the azimuth direction. Therefore, calibration is necessary to correct magnetic errors (that is offset) due to the magnetic fields generated from the electronic parts and the like inside the portable terminal.

In the case of a portable terminal with a two-axis geomagnetic sensor mounted in it, calibration is performed in such a manner that a user rotates the portable terminal, for example, 180 degrees to collect measurement data from the magnetic sensor during the rotation of the portable terminal so as to estimate offset based on the measurement data.

A technique for calibrating the magnetic sensor mounted in such a portable terminal is disclosed, for example, in Japanese patent laid-open No. 2004-12416. In this technique, the portable terminal is rotated at predetermined angles to estimate offset based on data measured at each angle by the magnetic sensor, thereby performing calibration irrespective of the rotating speed.

However, even in the method disclosed in Japanese patent laid-open No. 2004-12416, the user has to perform calibration by consciously rotating the portable device with the magnetic sensor mounted in it. Although it is less complicated than other conventional methods, since it requires the user to follow the calibration procedure, it remains burdensome for the user to follow the procedure. In particular, in the case of a three-axis geomagnetic sensor, since the calibration requires three-axis data, the user is required to follow a more troublesome procedure.

DISCLOSURE OF THE INVENTION

In one aspect of the present invention, there is proposed an azimuth data computing method comprising the steps of: inputting a signal from a geomagnetic sensor to measure a magnetic field which may be a mixture of a geomagnetic field and other magnetic field causing an offset, thereby providing measurement data of the magnetic field, which is represented by a set of coordinate components corresponding to a set of different axes of a given coordinates space; calculating an offset value of the offset based on a plurality of the measurement data which are measured successively from the signal inputted from the geomagnetic sensor; comparing the plurality of the measurement data used for calculating the offset value with one anther in terms of the coordinate components of each axis to obtain a difference between a maximum value and a minimum value of the coordinate components for each axis; judging the calculated offset value to be valid when the difference obtained for each axis is greater than a predetermined threshold difference; updating a previous offset value based on the offset value currently judged to be valid; and correcting the measurement data which is provided after the previous offset value has been updated, according to the updated offset value and computing azimuth data according to the corrected measurement data.

In another aspect of the present invention, there is proposed an azimuth data computing method comprising the steps of: inputting a signal from a geomagnetic sensor to measure a magnetic field which may be a mixture of a geomagnetic field and other magnetic field causing an offset, thereby providing measurement data of the magnetic field, which is represented by a set of coordinate components corresponding to a set of different axes of a given coordinates space; determining whether overflow or underflow occurs to the measurement data for correcting the measurement data to fall within a predetermined range when it is determined that the overflow or underflow occurs to the measurement data; determining whether to store current measurement data based on a distance between the current measurement data and previous measurement data stored previously, the distance being defined between corresponding positions of the current measurement data and the previous measurement data in the given coordinates space; calculating an offset value of the offset based on a plurality of the stored measurement data; comparing the plurality of the measurement data used for the calculating of the offset value with one anther in terms of the coordinate components of each axis to obtain a difference between a maximum value and a minimum value of the coordinate components for each axis; judging the calculated offset value to be valid when the difference obtained for each axis is greater than a predetermined threshold difference; updating a previous offset value based on the offset value currently judged to be valid; and correcting the measurement data which is provided after the previous offset value has been updated, according to the updated offset value and computing azimuth data according to the corrected measurement data.

Note that the distance between a pair of measurement data (Hx1, Hy1, Hz1) and (Hx2, Hy2, Hz2) is defined by:

$$\sqrt{(Hx1-Hx2)^2+(Hy1-Hy2)^2+(Hz1-Hz2)^2}.$$

In still another aspect of the present invention, there is proposed an azimuth data computing method comprising the steps of: inputting a signal from a geomagnetic sensor to measure a magnetic field which may be a mixture of a geomagnetic field and other magnetic field causing an offset, thereby providing measurement data of the magnetic field, which is represented by a set of coordinate components corresponding to a set of different axes of a given coordinates space; determining whether to store current measurement data based on a distance between the current measurement data and previous measurement data stored previously, the distance being defined between corresponding positions of the current measurement data and the previous measurement data in the given coordinates space; calculating an offset value of the offset based on a plurality of the stored measurement data; comparing the plurality of the measurement data used for the calculating of the offset value with one anther in terms of the coordinate components of each axis to obtain a difference between a maximum value and a minimum value of the coordinate components for each axis; judging the calculated offset value to be valid when the difference obtained for each axis is greater than a predetermined threshold difference; when the valid offset value is greater than a predetermined reference value, returning to the step of determining whether to store the measurement data while removing the valid offset value from each measurement data successively measured from the inputted signal; when the valid offset value is smaller than the predetermined reference value, updating a previous offset value according to the valid offset value currently judged to be valid; and correcting the measurement data which is provided after the previous offset value has been updated, according to the updated offset value and computing azimuth data according to the corrected measurement data.

In yet another aspect of the present invention, there is proposed a compass sensor unit comprising: a magnetic field measuring section that inputs a signal from the geomagnetic sensor to measure a magnetic field which may be a mixture of a geomagnetic field and other magnetic field causing an offset, thereby providing measurement data of the magnetic field, which is represented by a set of coordinate components corresponding to a set of different axes of a given coordinates space; a measurement data storing section that stores the measurement data which are measured successively from the signal inputted from the geomagnetic sensor; an offset calculating section that calculates an offset value of the offset based on a plurality of the measurement data stored in the measurement data storing section; an offset validity judging section that compares the plurality of the measurement data with one anther in terms of the coordinate components of each axis to obtain a difference between a maximum value and a minimum value of the coordinate components for each axis, and that judges the calculated offset value to be valid when the difference obtained for each axis is greater than a predetermined threshold difference; an offset storing section that stores a previous offset value of the offset; an offset setting section that adds the valid offset value to the previous offset value stored in the offset storing section to thereby update the offset value; a computing section that removes the offset value updated by the offset setting section from the measurement data which is provided after the previous offset value has been updated, to compute corrected measurement data; and an azimuth measuring section that computes azimuth data according to the corrected measurement data.

The compass sensor unit may further comprise an integrator section that integrates the measurement data of the magnetic data outputted from the computing section, and that provides the integrated measurement data to the azimuth measuring section.

Alternatively, the compass sensor unit may further comprise a detection section that monitors the measurement data of the magnetic field to detect occurrence of overflow or underflow, such that when the occurrence of overflow or underflow is detected, an appropriate correction value is inputted to the computing section to compensate for the overflow or underflow of the measurement data.

Alternatively, the compass sensor unit may further comprise an offset magnitude determining section that compares the offset value judged to be valid by the offset validity judging section with a given reference value, the offset magnitude determining section being operative when the valid offset value is greater than the given reference value for outputting the valid offset value to the computing section, or being operative when the valid offset value is smaller than the given reference value for outputting the valid offset value to the azimuth measuring section.

Alternatively, the compass sensor unit may further comprise either of: a temperature sensor that detects temperature, and a temperature correction value calculating section that calculates a temperature correction value from the detected temperature and outputs the calculated temperature correction value to the azimuth measuring section for correcting the azimuth data for the temperature; or a tilt sensor that detects a tilt of the geomagnetic sensor, and a tilt correction value calculating section that calculates a tilt correction value from the detected tilt and outputs the calculated tilt correction value to the azimuth measuring section for correcting the azimuth data for the detected tilt.

Preferably, the compass sensor unit may further comprise: a temperature sensor that detects temperature; a temperature correction value calculating section that calculates a temperature correction value from the detected temperature and outputs the calculated temperature correction value to the azimuth measuring section for correcting the azimuth data for the detected temperature; a tilt sensor that detects a tilt of the geomagnetic sensor; a tilt correction value calculating section that calculates a tilt correction value from the detected tilt and outputs the calculated tilt correction value to the azimuth measuring section for correcting the azimuth data for the detected tilt; and a correction data determining section that compares current one and previous one of the temperature correction values calculated successively by the temperature correction value calculating section to determine whether to output the current temperature correction value to the azimuth measuring section, and that compares current one and previous one of the tilt correction values calculated successively by the tilt correction value calculating section to determine whether to output the current tilt correction value to the azimuth measuring section.

In yet another aspect of the present invention, there is proposed a portable electronic device provided with the compass sensor unit as described above.

BEST MODES FOR CARRYING OUT THE INVENTION

Embodiments of the present invention will now be described with reference to the accompanying drawings.

Figure 1:
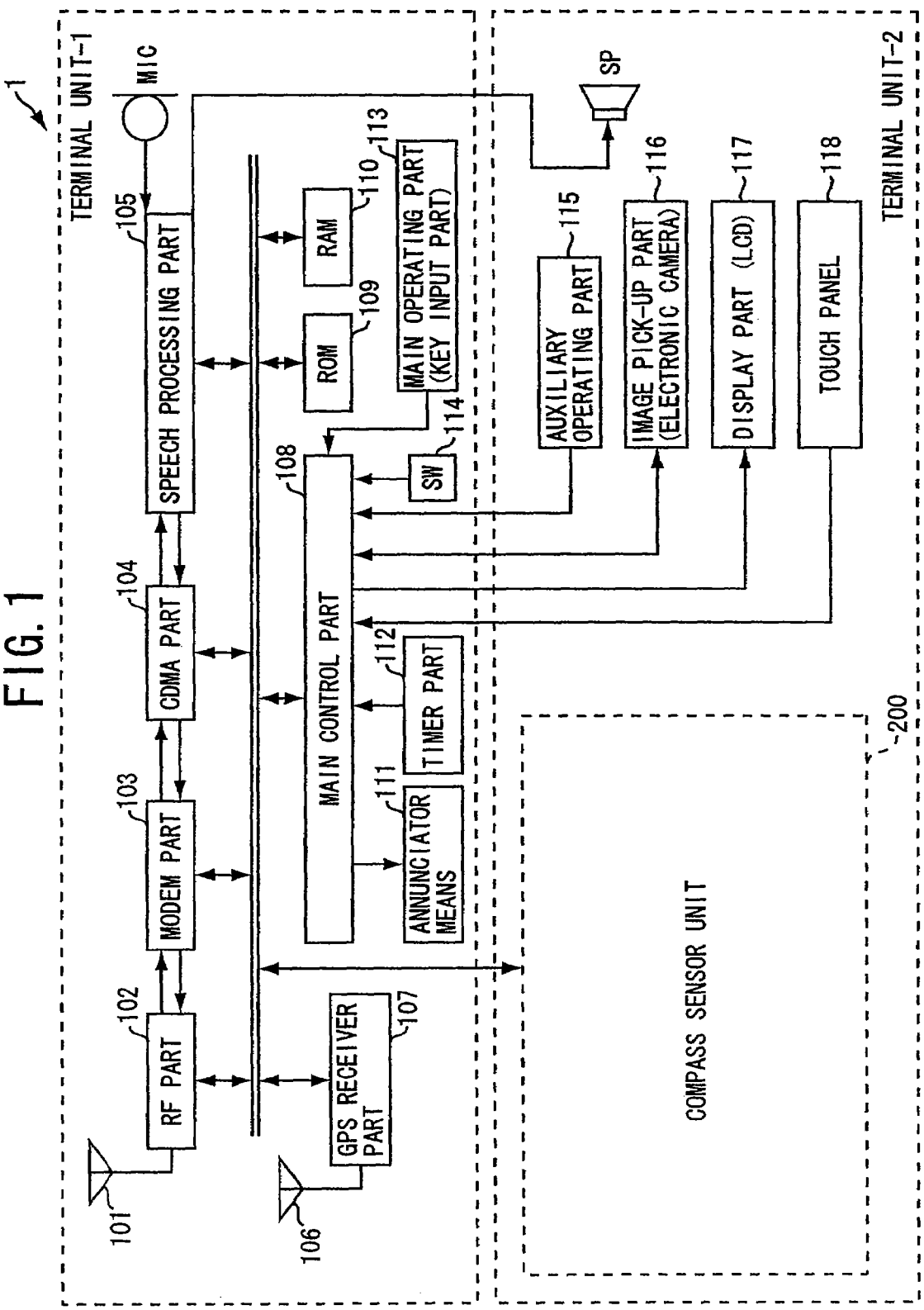
FIG. 1 is a block diagram showing the structure of a portable electronic device (portable terminal) according to the present invention.

FIG. 1 is a block diagram showing the electrical structure of a portable electronic device according to a preferred form of the present invention by taking an example a CDMA (Code Division Multiple Access) portable communication terminal (hereinafter called the portable terminal).

Portions common to one another in the drawings are given the same reference numerals.

As shown in FIG. 1, a portable terminal 1 of this form includes antennas 101 and 106, an RF part 102, a modem part 103, a CDMA part 104, a speech processing part 105, a GPS receiver part 107, a main control part 108, a ROM 109, a RAM 110, annunciator means 111, a timer part 112, a main operating part 113, an SW 114, an electronic image pickup part 116, a display part 117, a touch panel 118, an auxiliary operating part 115, and a compass sensor unit 200.

As shown in FIG. 1, the antenna 101 exchanges radio waves with a radio base station, not shown. The RF part 102 performs processing related to sending and receiving signals. The RF part 102 is equipped with a local oscillator and the like. Upon reception, the RF part 102 mixes a local oscillator signal of a given frequency with a received signal from the antenna 101 to convert the received signal to a received IF signal of an intermediate frequency (IF), and output it to the modem part 103. Upon transmission, the RF part 102 mixes a local oscillator signal of a given frequency with a transmit IF signal of an intermediate frequency to convert the transmit IF signal to a transmit signal of a transmit frequency, and output it to the antenna 101.

The modem part 103 demodulates the received signal and modulates the transmit signal. The modem part 103 is equipped with a local oscillator and the like to convert the received IF signal from the RF part 102 into a baseband signal of a given frequency, convert the baseband signal to a digital signal and output the digital signal to the CDMA part 104. On the other hand, the modem part 103 converts a digital baseband signal from the CDMA part 104 into a transmit analog signal, converts it to a transmit IF signal of a given frequency, and outputs it to the RF part 102.

The CDMA part 104 encodes the transmit signal and decode the received signal. The CDMA part 104 decodes the baseband signal output from the modem part 103. On the other hand, the CDMA part 104 encodes the transmit signal and outputs the coded baseband signal to the modem part 103.

The speech processing part 105 performs speech processing during a call. The speech processing part 105 converts an analog speech signal output from the microphone (MIC) during the call, and outputs it to the CDMA part 104 as a transmit signal. On the other hand, the speech processing part 105 generates an analog driving signal for driving a speaker (SP) based on a signal representing speech data decoded during the call by the CDMA part 104, and outputs it to the speaker (SP). The microphone (MIC) generates a speech signal based on voice input by the user, and outputs it to the speech processing part 105. The speaker (SP) sounds the voice of a calling partner based on a signal output from the speech processing part 105.

The GPS antenna 106 receives radio waves transmitted from GPS satellites, not shown, and outputs received signals based on the radio waves to the GPS receiver part 107. The GPS receiver part 107 demodulates the received signals, and acquires information based on the received information, such as accurate time information and propagation time from each of the GPS satellites. The GPS receiver part 107 calculates distances to three or more GPS satellites based on the acquired information to calculate a position in three-dimensional space (latitude, longitude, altitude, etc) based on the triangulation principle.

The main control part 108 includes a CPU (Central Processing Unit) and the like to control each internal part of the portable terminal 1. The main control part 108 inputs and outputs control signals or data through a bus to and from the RF part 102, the modem part 103, the CDMA part 104, the speech processing part 105, the GPS receiver part 107, the compass sensor unit 200 to be described below, the ROM 109, and the RAM 110. The ROM 109 stores various programs to be executed by the main control part 108, and initial characteristic values and the like of a temperature sensor and a tilt sensor measured at the time of shipping inspection. The RAM 110 temporarily stores data and the like to be processed by the main control part 108. The ROM 109 is a recording medium for use in the portable electronic apparatus 1 having a processor in the form of CPU and a geomagnetic sensor. The ROM 109 contains program instructions executable by the CPU for causing the electronic apparatus 1 to perform the inventive methods of computing azimuth data, details of which will be described later.

The annunciator means 111 includes, for example, a speaker, a vibrator, and/or a light-emitting diode to inform the user of the arrival of a call or e-mail using sound, vibration, and/or light. The timer part 112 has a timer function for creating time information indicating year, month, day, day of the week, time, etc. The main operating part 113 includes input keys for entering characters, a conversion key for conversion to Chinese characters, numerals, etc., cursor keys, a power on/off key, a talk key, a redial key, etc. operated by the user; it outputs signals indicating the operation results to the main control part 108. The opening/closing switch (SW) 114 is a switch for detecting the beginning of opening or end of closing of a folding portable terminal.

The compass sensor unit 200 includes magnetic sensors (1) to (3) for detecting x-axis, y-axis, and z-axis magnetic fields orthogonal to one another, a temperature sensor for detecting temperature, a physical-value sensor for detecting the inclination, or tilt angle, of the portable terminal 1, and a processing block for processing the detection results from the respective sensors. The details will be described later using FIG. 2.

The electronic image pickup part 116 includes an optical lens and an image pickup device such as a CCD (Charge Coupled Device). The image pickup device converts, into an analog signal, an image of a subject formed through the optical lens on an image pickup plane of the image pickup device, converts the analog signal to a digital signal, and outputs it to the main control part 108. The display part 117 includes a liquid crystal display or the like on which images or characters are displayed based on display signals output from the main control part 108. The touch panel 118 is incorporated on the surface of the liquid crystal display included in the display part 117 to output, to the main control part 108, a signal corresponding to a user's operation. The auxiliary operating part 115 includes a push switch and the like used for display switching.

A first embodiment will next be described using FIGS. 2 to 4.

Figure 2:
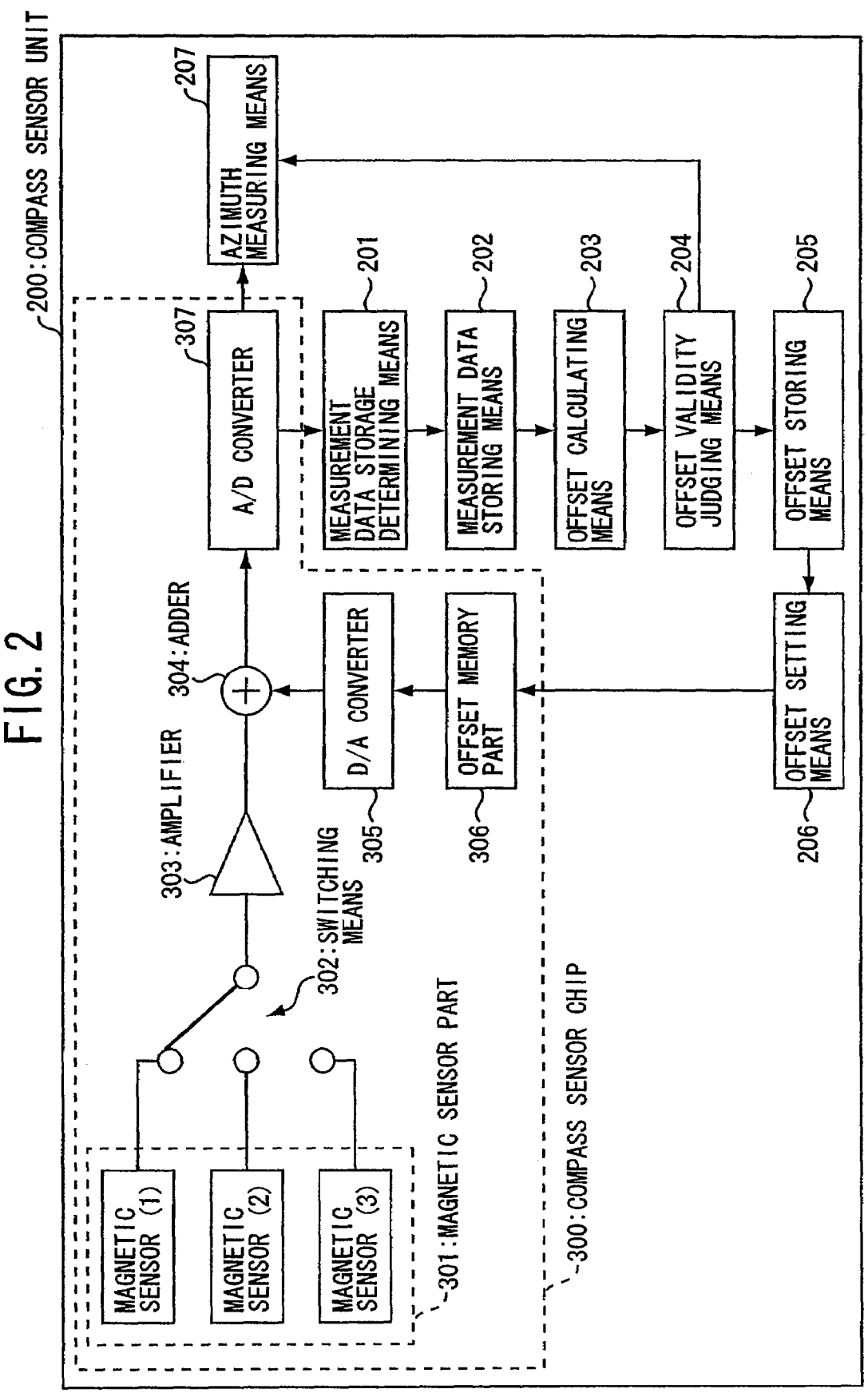
FIG. 2 is a block diagram showing the structure of a compass sensor unit according to a first embodiment.

As shown in FIG. 2, the compass sensor unit according to the embodiment includes measurement data storage determining means 201, measurement data storing means 202, offset calculating means 203, offset validity judging means 204, offset storing means 205, offset setting means 206, azimuth measuring means 207, and a compass sensor chip 300. The compass sensor chip 300 further includes a magnetic sensor part 301, a switching means 302, an amplifier 303, an adder 304, a D/A converter 305, an offset memory part 306, and an A/D converter 307.

Upon calibration, the measurement data storage determining means 201 performs processing related to data storage such as to determine whether to store measurement data, indicated by a digital signal corresponding to the output of a magnetic sensor, into the measurement data storing means 202. In this specification, the calibration means the steps of measuring a magnetic field which may be mixture of a net geomagnetic field and other extraneous magnetic field causing a varying offset, computing an offset value of the varying offset based on the measurement data of the magnetic field, and updating previous offset value based on new offset value by recurrently sampling the measurement data and computing the offset value. The measurement data storing means 202 captures data from the measurement data storage determining means 201 to store the data by a predetermined storage method (the details will be described later).

The offset calculating means 203 calculates offset based on the measurement data acquired during the calibration (the details will be described later). The offset validity judging means 204 judges the validity of the offset calculated by the offset calculating means 203 (the details will be described later).

The offset storing means 205 updates the already stored offset value to the offset value judged to be valid by the offset validity judging means 204. The offset setting means 206 sums up the offset value output into the offset memory part 306 and the offset value output from the offset storing means 205 to output the total value to the offset memory part 306. The azimuth measuring means 207 measures an azimuth direction from the measurement data input from the A/D converter 307 to be described later.

It is conceivable in general that the offset of a magnetic sensor includes offset unique to the magnetic sensor, offset influenced by peripheral circuits, and offset caused by the turbulence of the magnetic field under the influence of the other parts. Among them, the offset unique to the magnetic sensor and the offset influenced by the peripheral circuits take relatively constant values. Therefore, these values may be measured beforehand and prestored in the offset setting means 206.

The magnetic sensor part 301 includes magnetic sensors (1) to (3), and sensor initialization means (1) to (3), not shown, for initializing each magnetic sensor after power-on. When a ferromagnetic field is applied, the direction of the magnetization of each magnetic body of the magnetic sensors is changed or distorted. To avoid this, the sensor initialization means (1) to (3) are provided to reset each of the magnetic sensors (1) to (3) to its initial state.

The switching means 302 switches among the magnetic sensors (1) to (3) of the magnetic sensor part 301 to input each of magnetic field data sequentially from the magnetic sensors (1) to (3) to the amplifier 303. The adder 304 subtracts from the output of the amplifier 303, an analog signal D/A converted by the D/A converter 305 from the offset value corresponding to each of the magnetic sensors (1) to (3). The A/D converter 307 converts the output of the adder 304 to a digital signal, and outputs it to the azimuth measuring means 207.

Next, specific processing will be described using FIG. 3.

Figure 3:
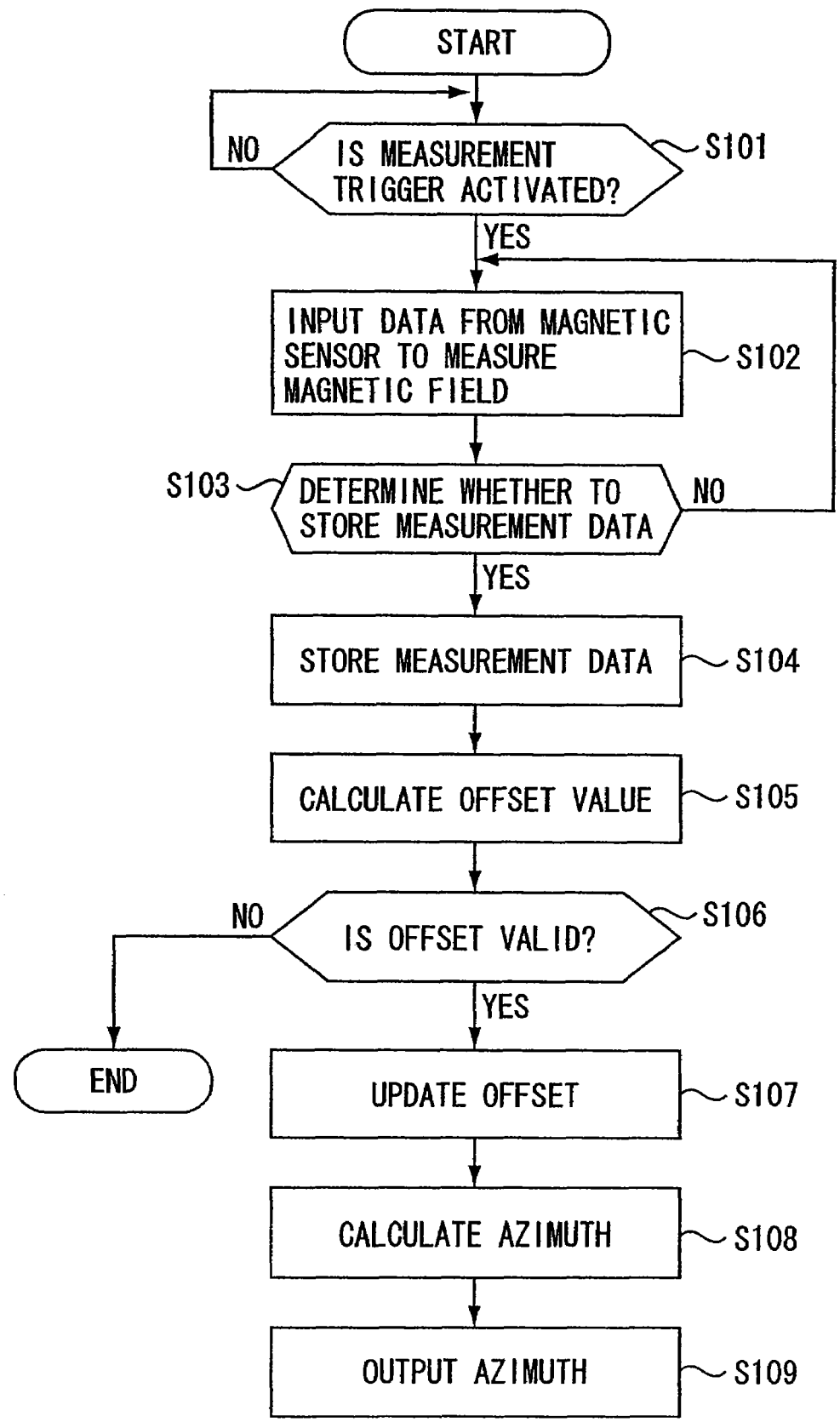
FIG. 3 is a flowchart related to output of azimuth data according to the first embodiment.

As shown in FIG. 3, for example, when an application program or the like requiring azimuth measurement is activated, the compass sensor unit 200 is triggered to perform measurement (step 101) in response to a request from the application program. The application program may include a navigation software using azimuth data. Specifically, it is considered that the trigger is activated at constant intervals. There are other possible triggering methods, such as to trigger in response to an azimuth measuring request from the application program side, and to trigger when it is conceivable that the azimuth direction could have changed as a result of monitoring another device in the portable terminal (for example, at the time when image data input in the electronic image pickup part 116 has slid).

The method of triggering at constant intervals performs data measurement periodically. Therefore, this method has the advantage of short response time because previously measured data have only to be output whenever the application program makes a request to measure azimuth. The method of triggering in response to an azimuth measuring request from the application program can minimize the number of measurements. Therefore, this method has the advantage of reducing wasteful power consumption. The method of triggering according to the state of another device has the combined advantages of both methods though it is a necessary condition that another device in the portable terminal is operating. Any method may be selected as appropriate according to the features of the device.

When the measurement trigger is activated, magnetic field is measured from data input from the magnetic sensor part 301, converted to digital measurement data, and output to the measurement data storage determining means 201 and the azimuth measuring means 207 (step 102). The measurement data storage determining means 201 performs processing for determining whether to store the data into the measurement data storing means 202 (step 103).

The measurement data storage determining means 201 refers to data stored in the measurement data storing means 202 to determine whether to store the input data into the measurement data storing means 202 based on a determination method to be described later. When determining that the input data should be stored, the data is stored in the measurement data storing means 202.

The data is determined to be stored when no data is stored in the measurement data storing means 202. If any data is already stored, the data may be determined to be stored only when it is spaced apart a given distance or more from the last stored data. This method has the advantage of being able to prevent the data from being locally distributed.

Note that the distance between measurement data (Hx1, Hy1, Hz1) and (Hx2, Hy2, Hz2) is $$\sqrt{(Hx1-Hx2)^2+(Hy1-Hy2)^2+(Hz1-Hz2)^2}.$$

Namely, each of the measurement data is represented by a set of coordinate components corresponding to a set of different axes x, y, z of a given coordinates space. The distance is defined between a pair of corresponding positions of the measurement data in the given coordinates space.

Alternative determination methods are also considered, such as a method of storing all data or only when no data is stored in the measurement data storing means 202. In another method, when any data is already stored, new data is stored only when it is spaced apart a given distance or more from all of the stored data in the coordinates space. Since the former method can collect reams of data in the shortest time and hence increase the frequency of calibration, it has the advantage of being able to correct offset in a short time even if an offset change occurs.

The latter method is excellent at maintaining the uniformity of data, but it requires long time to accumulate data. Based on the above-mentioned matters, any method may be selected as appropriate according to the features of the device. Note that a suitable value for the given distance is about 3.98 [A/M].

As described above, in the inventive compass sensor unit having a geomagnetic sensor, a magnetic field measuring section inputs a signal from the geomagnetic sensor to measure a magnetic field which may be mixture of a geomagnetic field and other magnetic field causing an offset, thereby successively providing measurement data of the magnetic field including previous measurement data and current measurement data. Each of the measurement data is represented by a set of coordinate components corresponding to a set of different axes of a given coordinates space. A measurement data storing section has a storage and determines whether to store the current measurement data in the storage based on distances between the current measurement data and a plurality of the previous measurement data already stored in the storage. Each distance is defined between corresponding positions of the current measurement data and each of the previous measurement data in the given coordinates space. The measurement data storing section stores the current measurement data in the storage when the current measurement data is determined to be stored. An offset value calculating section calculates an offset value of the offset based on the plurality of the measurement data stored in the storage including the current measurement data and the previous measurement data. An offset setting section updates an old offset value which has been already calculated, based on a new offset value which is newly calculated. A computing section removes the offset value updated by the offset setting section from the measurement data which is provided after the old offset value has been updated, to compute corrected measurement data. An azimuth measuring section computes azimuth data according to the corrected measurement data.

The measurement data storing means 202 captures the data from the measurement data storage determining means 201, stores it based on a storage method to be described later (step 104), and inquires of offset calculation triggering means, not shown, as to whether the data should be output to the offset calculating means 203. The offset calculation triggering means replies as to whether the data should be output to the offset calculating means 203 based on a triggering method to be described later. When receiving an instruction to output data to the offset calculating means 203, the measurement data storing means 202 outputs the stored data to the offset calculating means 203.

A data storage method is considered, which accumulates data in order of capture, and upon completion of offset calculation processing in response to a trigger from the offset calculation triggering means, which deletes all the data and starts accumulation of data over again. This method has the advantage of low processing load.

Other data storage methods are also considered, such as a method, which accumulates data in order of capture, and when a given amount of data are stored, which deletes the oldest data while storing new data so that the given amount of data will be always held, and a method, which accumulates data in order of capture, and upon completion of offset calculation processing in response to a trigger from the offset calculation triggering means, which deletes part of data in order of storage to start accumulation of data.

The former method accumulates data in order of capture, and when a given amount of data are stored, deletes the oldest data while storing new data so that the given amount of data will be always held. Since the former method can increase the frequency of calibration, it has the advantage of being able to correct offset in the shortest time. The latter method accumulates data in order of capture, and upon completion of offset calculation processing in response to a trigger from the offset calculation triggering means, deletes part of data in order of storage to start accumulation of data. The latter method can also correct offset in a short time, but it requires high calculation load for calibration. However, even with such a disadvantage, the latter method can reduce the frequency of offset calculation and hence the load of calculation processing, compared with the former method.

As described above, in the inventive compass sensor unit having a geomagnetic sensor, a magnetic field measuring section inputs a signal from the geomagnetic sensor to measure a magnetic field which may be mixture of a geomagnetic field and other magnetic field causing an offset, thereby successively providing measurement data of the magnetic field including old and new measurement data. A measurement data storing section has a storage and stores the measurement data successively measured from the input signal of the geomagnetic sensor in the storage. The measurement data storing section erases the oldest one of the stored measurement data from the storage when a number of the stored measurement data reaches a predetermined number while storing new one of the measurement data in the storage to thereby keep contents of the storage fresh. An offset calculating section calculates an offset value of the offset based on the measurement data stored in the storage.

A still another data storage method may be adopted, which accumulates data in order of value, and when a given amount of data are stored, which replaces one of the stored data by the newest data to be stored. The replaced data has a direction closest to the newest data. In this case, when the magnitude of an offset change is small, it can keep the data density uniformly, compared with the above-mentioned methods, while when the magnitude of the offset change is larger than the radius of a compass sphere, it may keep unnecessary data for ever. Therefore, the choice of which method to select may be made as appropriate according to the features of the device. By the way, the compass sphere is defined in the coordinates space allocated to the magnetic sensor. The compass sphere has a center corresponding to an offset point in the coordinate space, and a radius corresponding to a magnitude of the geomagnetic field.

As described above, in the inventive compass sensor unit having a geomagnetic sensor, a magnetic field measuring section inputs a signal from the geomagnetic sensor to measure a magnetic field which may be mixture of a geomagnetic field and other magnetic field causing an offset, thereby successively providing measurement data of the magnetic field. Each measurement data is represented by a vector having a direction and a magnitude. A measurement data storing section has a storage and stores the measurement data successively measured from the input signal of the geomagnetic sensor in the storage. The measurement data storing section is operable when a number of the measurement data stored in the storage reaches a predetermined number and when new measurement data is provided, for detecting one of the stored measurement data having a direction closest to the direction of the new measurement data, and replacing the detected measurement data by the new measurement data to thereby keep balance of contents of the storage. An offset calculating section calculates an offset value of the offset based on the measurement data stored in the storage.

On the other hand, in order to trigger offset calculation, there is a method for activating a trigger when a given amount of data are accumulated. In this case, since the number of data pieces is always constant, the accuracy of calculation based on the number of data pieces is reliable. Therefore, this method has the advantage of making it easy to judge the validity of data. Other triggering methods may also be adopted, such as a method of activating a trigger when the given amount of data are stored after a certain period of time has elapsed from the last computation of the offset value, and a method of triggering at constant intervals as long as the number of pieces of data is four or more.

The former method activates a trigger when a given amount of data are accumulated, or activates a trigger when the given amount of data are stored after a certain period of time has elapsed from the last computation of the offset value. Since the former method can complete calibration in a short time, it has the advantage of being able to correct an offset change in a shorter time. On the other hand, the latter method triggers at constant intervals as long as the number of pieces of data is four or more. The latter method has the advantage of avoiding such a situation that calibration will not start for a long time. Therefore, based on the above-mentioned matters, any method may be selected as appropriate according to the features of the device.

As described above, in the compass sensor unit having a geomagnetic sensor, a magnetic field measuring section inputs a signal from the geomagnetic sensor to measure a magnetic field which may be mixture of a geomagnetic field and other magnetic field causing a varying offset, thereby successively providing measurement data of the magnetic field. A measurement data storing section has a storage and stores the measurement data successively measured from the input signal of the geomagnetic sensor in the storage. An offset calculating section periodically calculates an offset value representative of the varying offset at a given time interval based on a plurality of the measurement data stored in the storage, such that a new offset value of the varying offset is calculated at the given time interval after a previous offset value of the varying offset has been calculated.

Alternatively, a measurement data storing section has a storage and stores the measurement data successively measured from the input signal of the geomagnetic sensor in the storage. An offset calculating section commences a current offset calculation when a predetermined time has passed from a previous offset calculation and when a number of the measurement data stored in the storage reaches a predetermined number for calculating a new offset value representative of the varying offset.

Then, when the measurement data is supplied from the measurement data storing means 202 to the offset calculating means 203, offset is calculated based on these pieces of measurement data (step 105).

The following describes an offset calculation algorithm.

If the measurement data is expressed by $(x_i, y_i, z_i)$ where $I=1, \ldots, N$, the offset is $(X0, Y0, Z0)$, and the radius of the compass sphere is R, the following equation is given:

$$(x_i-X0)^2+(y_i-Y0)^2+(z_i-Z0)^2=R^2.$$

In this case, the least square error $\epsilon$ is defined as follows:

$$\varepsilon = \sum \{(x_i - X0)^2 + (y_i - Y0)^2 + (z_i - Z0)^2 - R^2\}^2$$
$$= \sum \{(x_i^2 + y_i^2 + z_i^2) - 2x_iX0 - 2y_iY0 -$$
$$2z_iZ0 + (X0^2 + Y0^2 + Z0^2) - R^2\}^2$$

If $a=X_i^2+y_i^2+Z_i^2$, $b=-2x_i$, $c=-2y_i$, $d=-2z_i$, and $$D=(X0^2+Y0^2+Z0^2)-R^2 \quad (1)$$

$\epsilon$ is determined by the following equation:

$$\epsilon=\Sigma(a_i+b_iX0+c_iY0+d_iZ0+D)^2.$$

In the above definition, the variable D depends on other variables. In order to simplify the computation, the variable D is treated as an independent variable. In this case, requirements for setting the least square error $\epsilon$ to the minimum are given by differentiating $\epsilon$ with the variables $X0, Y0, Z0$, and D as shown in the following equations:

$$\begin{cases} \dfrac{\partial \varepsilon}{\partial X0} = 2\sum (a_i + b_iX0 + c_iY0 + d_iZ0 + D)b_i = 0 \\ \dfrac{\partial \varepsilon}{\partial Y0} = 2\sum (a_i + b_iX0 + c_iY0 + d_iZ0 + D)c_i = 0 \\ \dfrac{\partial \varepsilon}{\partial Z0} = 2\sum (a_i + b_iX0 + c_iY0 + d_iZ0 + D)d_i = 0 \\ \dfrac{\partial \varepsilon}{\partial D} = 2\sum (a_i + b_iX0 + c_iY0 + d_iZ0 + D) = 0 \end{cases}$$

As a result, the following is given:

$$\begin{bmatrix} [bb] & [bc] & [bd] & [b] \\ [bc] & [cc] & [cd] & [c] \\ [bd] & [cd] & [dd] & [d] \\ [b] & [c] & [d] & N \end{bmatrix} \begin{bmatrix} X0 \\ Y0 \\ Z0 \\ D \end{bmatrix} = \begin{bmatrix} -[ab] \\ -[ac] \\ -[ad] \\ -[a] \end{bmatrix}$$

where $$[m] = \sum_{i=1}^{N} m_i, \quad [mn] = \sum_{i=1}^{N} m_i n_i$$

By solving the above-mentioned simultaneous equations, there are obtained X0, Y0, Z0, D, which take the least square error as the minimum value. Further, R is determined from (1).

After the offset value is calculated, the offset validity judging means 204 judges the validity of the offset value (step 106). Specifically, the following values are determined from the calculated offset, the radius of the compass circle (sphere), and measurement data stored in the measurement data storing means 202:

$$\sigma = \frac{1}{R}\sqrt{\frac{N\sum_{i=1}^{N}\{(x_i-X0)^2+(y_i-Y0)^2+(z_i-Z0)^2\}-\left(\sum_{i=1}^{N}\sqrt{(x_i-X0)^2+(y_i-Y0)^2+(z_i-Z0)^2}\right)^2}{N^2}}$$

$$w_x = \frac{\text{Max}(x_i)-\text{Min}(x_i)}{R}$$

$$w_y = \frac{\text{Max}(y_i)-\text{Min}(y_i)}{R}$$

$$w_z = \frac{\text{Max}(z_i)-\text{Min}(z_i)}{R}$$

where $\text{Max}(x_i)$ represents the maximum value of measurement data $x_1, \ldots, x_N$, and $\text{Min}(x_i)$ represents the minimum value of measurement data $x_1, \ldots, X_N$. Further, $\sigma$ is a standard deviation. The above values are checked as to whether each of the above values meets the following criteria, respectively, and only when it meets each criterion, each estimated offset is judged to be valid:

$\sigma < F$ $w_x > G$ $W_y > G$ $w_z > G$ where F is preferably about 0.1, and G is about 1.

Then, when the offset is judged to be valid, the offset value stored in storage means, not shown, in the azimuth measuring means 207 is updated (step 107). The azimuth measuring means 207 operates based on the newly updated offset value in the storing means for removing the offset from the input measurement data, and calculates an azimuth direction by any of the following methods (step 108).

1) For example, assuming that the portable terminal is on the horizontal plane, the azimuth direction is determined based on the following:

if Abs(Hx)<Abs(Hy) and Hy>0, then direction(deg)=−arctan(Hx/Hy)*180/π, if Abs(Hx)<Abs(Hy) and Hy<0, then direction(deg)=180−arctan(Hx/Hy)*180/π, if Abs(Hx)>Abs(Hy) and Hx>0, then direction(deg)=90+arctan (Hx/Hy)*180/π, if Abs(Hx)>Abs(Hy) and Hx<0, then direction(deg)=270+arctan(Hx/Hy)*180/π.

2) Assuming that the portable terminal is tilted at an angle a (rad), the azimuth direction is determined based on the following:

when Hy'=Hycos(a)−Hz' sin(a), if Abs(Hx)<Abs(Hy') and Hy>0, then direction(deg)=−arctan(Hx/Hy')*180/π, if Abs(Hx)<Abs(Hy') and Hy<0, then direction(deg)=180−arctan(Hx/Hy')*180/π, if Abs(Hx)>Abs(Hy') and Hx>0, then direction(deg)=90+arctan(Hx/Hy')*180/π, if Abs(Hx)>Abs(Hyπ) and Hx<0, then direction(deg) =270+arctan(Hx/Hy')*180/π.

In the above equations, Hx, Hy, and Hz are the outputs of the magnetic sensors, respectively, the azimuth direction points along the y axis, and the magnetic north is zero degree.

Since it is relatively easy for the user to keep the portable terminal in a horizontal position, the method 1) has the advantage of being easy to obtain azimuth accurately. On the other hand, since the method 2) determines the azimuth direction in such a condition that the portable terminal is tilted in a range of angles at which the user usually holds it, a roughly correct azimuth direction can be determined. However, it may be difficult to head the portable terminal in a steady direction, so that accuracy cannot be expected so much.

The azimuth data thus obtained is output, for example, to the display part 117 or the like, and displayed on it (step 109).

Figure 4:
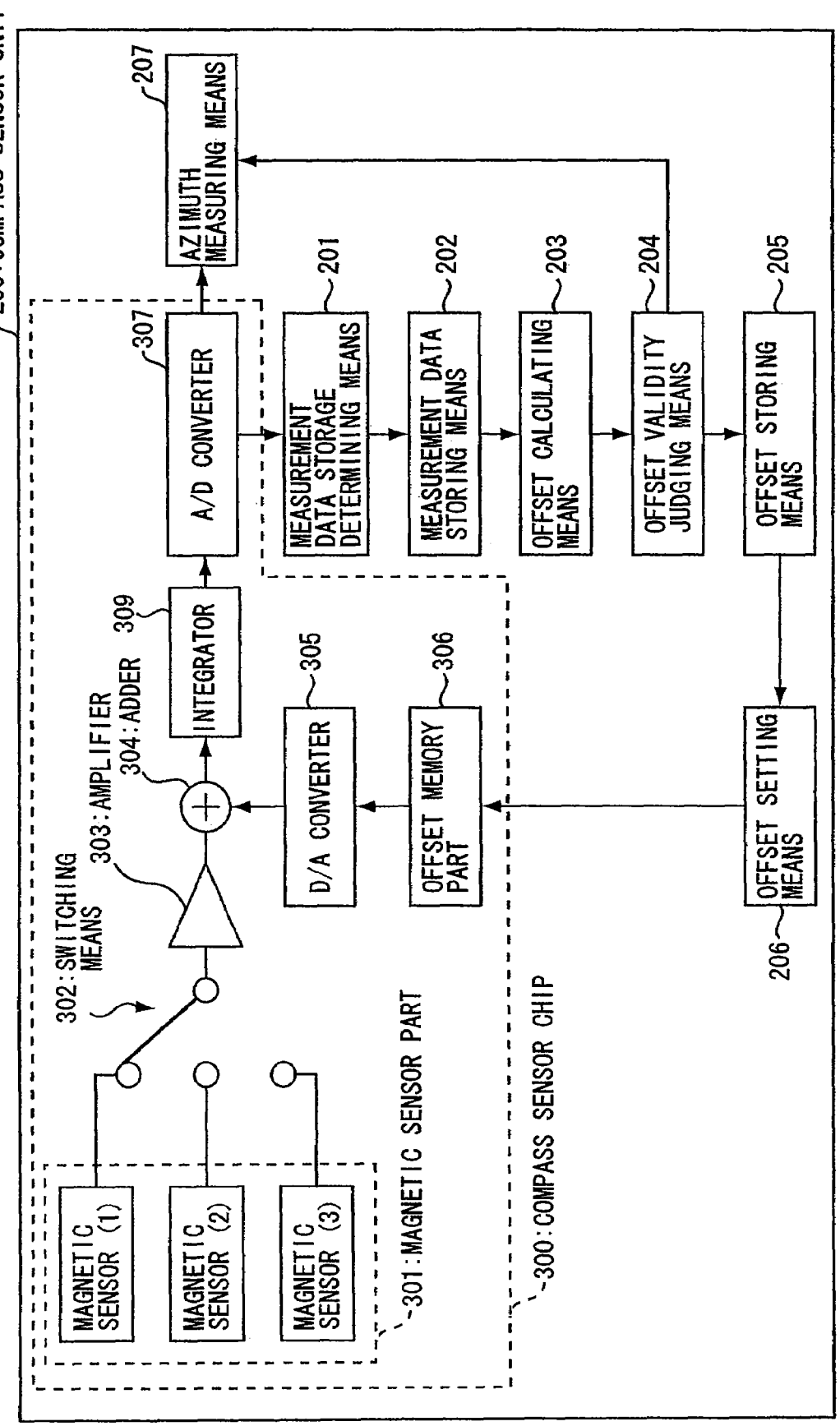
FIG. 4 is a block diagram showing the structure of a modification example of the compass sensor unit according to the first embodiment.

FIG. 4 shows a modification example of the embodiment, in which an integrator 309 is provided to the output of the adder 304. The integrator 309 is provided to average minute variations of measurement data in calculation of analog values, so that the accuracy of measurements can be improved. This modification structure is applicable to other embodiments to be described later.

A second embodiment will next be described using FIGS. 5 to 7.

Figure 5:
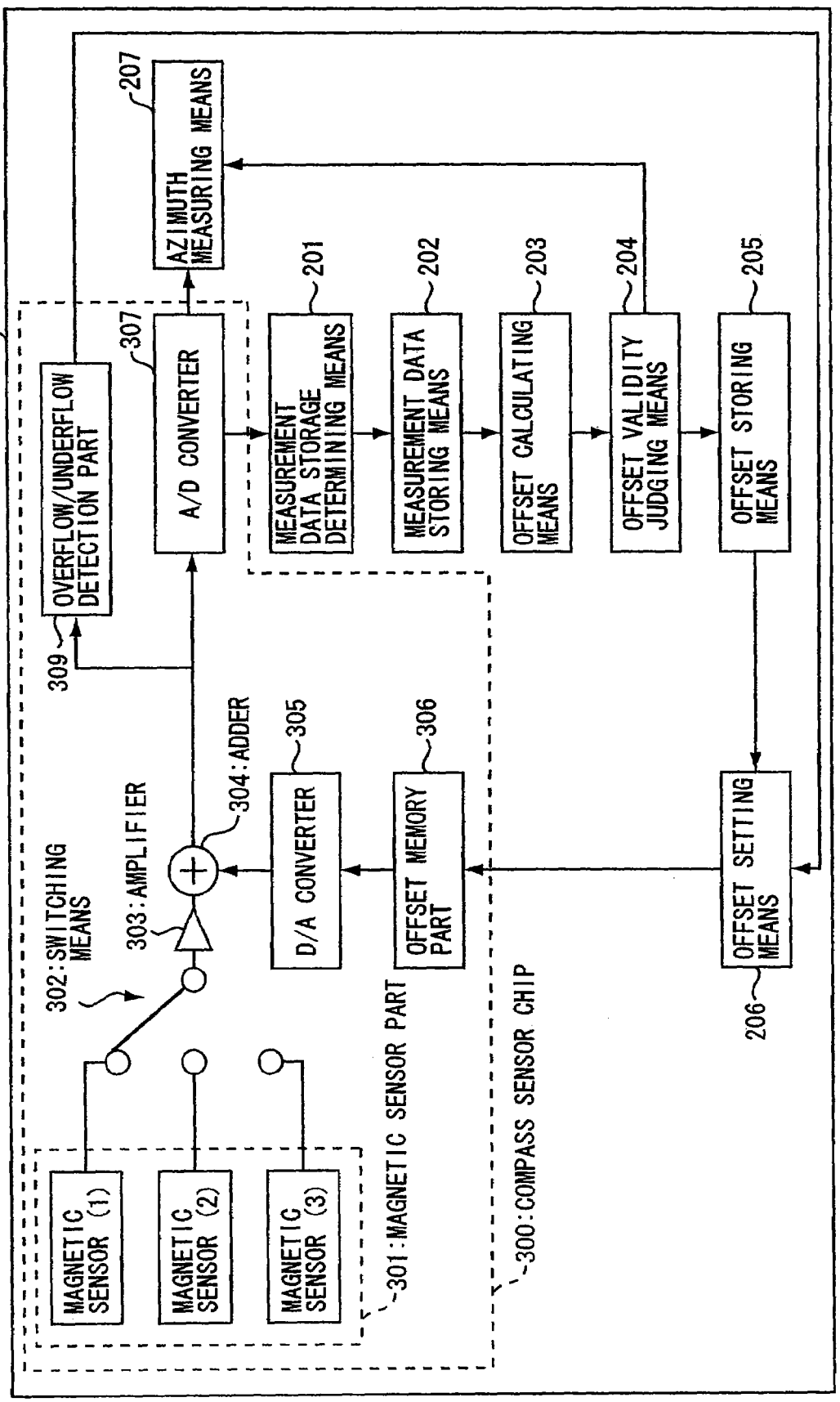
FIG. 5 is a block diagram showing the structure of a compass sensor unit according to a second embodiment.

As shown in FIG. 5, a compass sensor unit according to the second embodiment includes an overflow/underflow detection part 308 for monitoring the output of the amplifier 303 in the first embodiment.

The overflow/underflow detection part 308 detects whether the output of the amplifier 303 falls within an input range of the next stage A/D converter 307. When overflow or underflow occurs, a value based on detection results of the overflow/underflow detection part 308 is input into offset setting means 206 so that the output of the amplifier 303 will fall within the input range of the next stage A/D converter 307. The offset setting means 206 operates when the offset storing means 205 has previously stored offset value for summing up the value inputted from the overflow/underflow detection part 308 and the value previously stored in the offset storing means 205 with each other, to thereby set an offset value to be stored in the offset memory part 306.

Next, specific processing will be described using FIG. 6.

Figure 6:
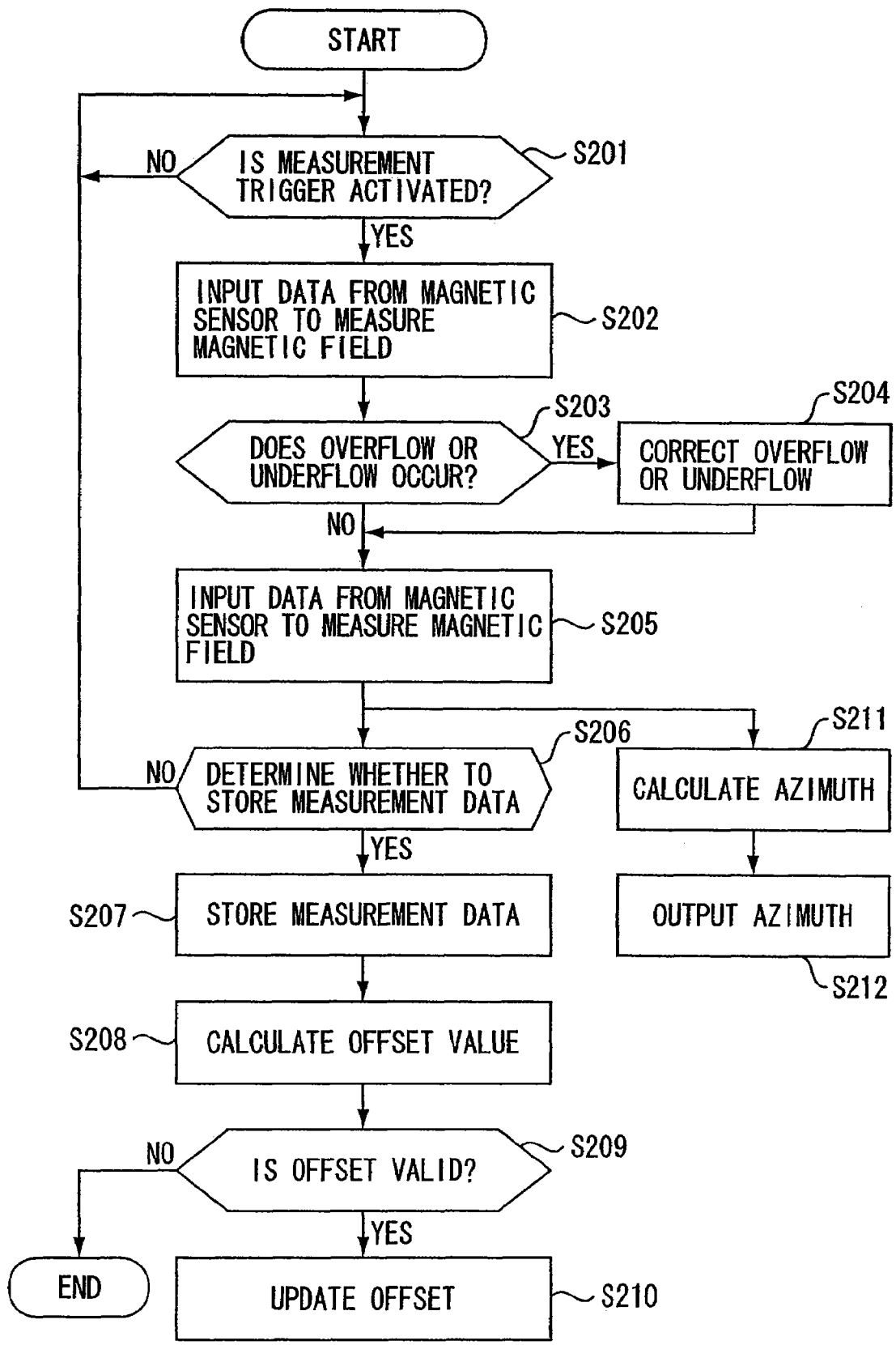
FIG. 6 is a flowchart related to output of azimuth data according to the second embodiment.

As shown in FIG. 6, for example, when an application program or the like requiring azimuth measurement is activated, the compass sensor unit 200 is triggered to perform measurement in the same manner as in the first embodiment (step 201). When the measurement trigger is activated, magnetic data is first measured from data input from the magnetic sensor part 301, and then the measured magnetic data is sent to the amplifier 303 (step 202).

After that, the overflow/underflow detection part 308 detects whether the output of the amplifier 303 falls within the input range of the next stage A/D converter 307. When overflow or underflow does not occur, the procedure goes to the next step, while when overflow or underflow occurs, a certain value based on the detection results of the overflow/underflow detection part 308 is input into the offset setting means 206 so that the output of the amplifier 303 will fall within the input range of the next stage A/D converter 307 (step 204) before the procedure goes to the next step (step 203). Then, magnetic field is remeasured from data input from the magnetic sensor part, converted to digital measurement data, and output to the measurement data storage determining means 201 and the azimuth measuring means 207 (step 205).

The measurement data storage determining means 201 performs processing for determining whether to store the data into the measurement data storing means 202 (step 206). When the measurement data is determined to be stored, it is stored in the measurement data storing means 202 (step 207), while when the measurement data is determined to be not stored, the procedure returns to step 201.

The measurement data storing means 202 captures the data from the measurement data storage determining means 201, stores it based on a storage method described above (step 207), and inquires of offset calculation triggering means, not shown, as to whether the data should be output to the offset calculating means 203. The offset calculation triggering means replies as to whether the data should be output to the offset calculating means 203 based on the above-mentioned triggering method. When receiving an instruction to output data to the offset calculating means 203, the stored data is output to the offset calculating means 203.

Upon receiving the input of the measurement data from the measurement data storing means 202, the offset calculating means 203 calculates offset according to the above-mentioned offset calculation algorithm (step 208). After the offset value is calculated, the offset validity judging means 204 judges the validity of the offset value (step 209). When the offset is judged to be valid, the offset value stored in storage means, not shown, in the azimuth measuring means 207 is updated (step 210).

On the other hand, the azimuth measuring means 207 operates based on a newly updated offset value in the storing means for removing the offset from the input measurement data, and calculates an azimuth direction (step 211). The azimuth data thus obtained is output, for example, to the display part 117 of the portable terminal, and displayed on it (step 212).

Figure 7:
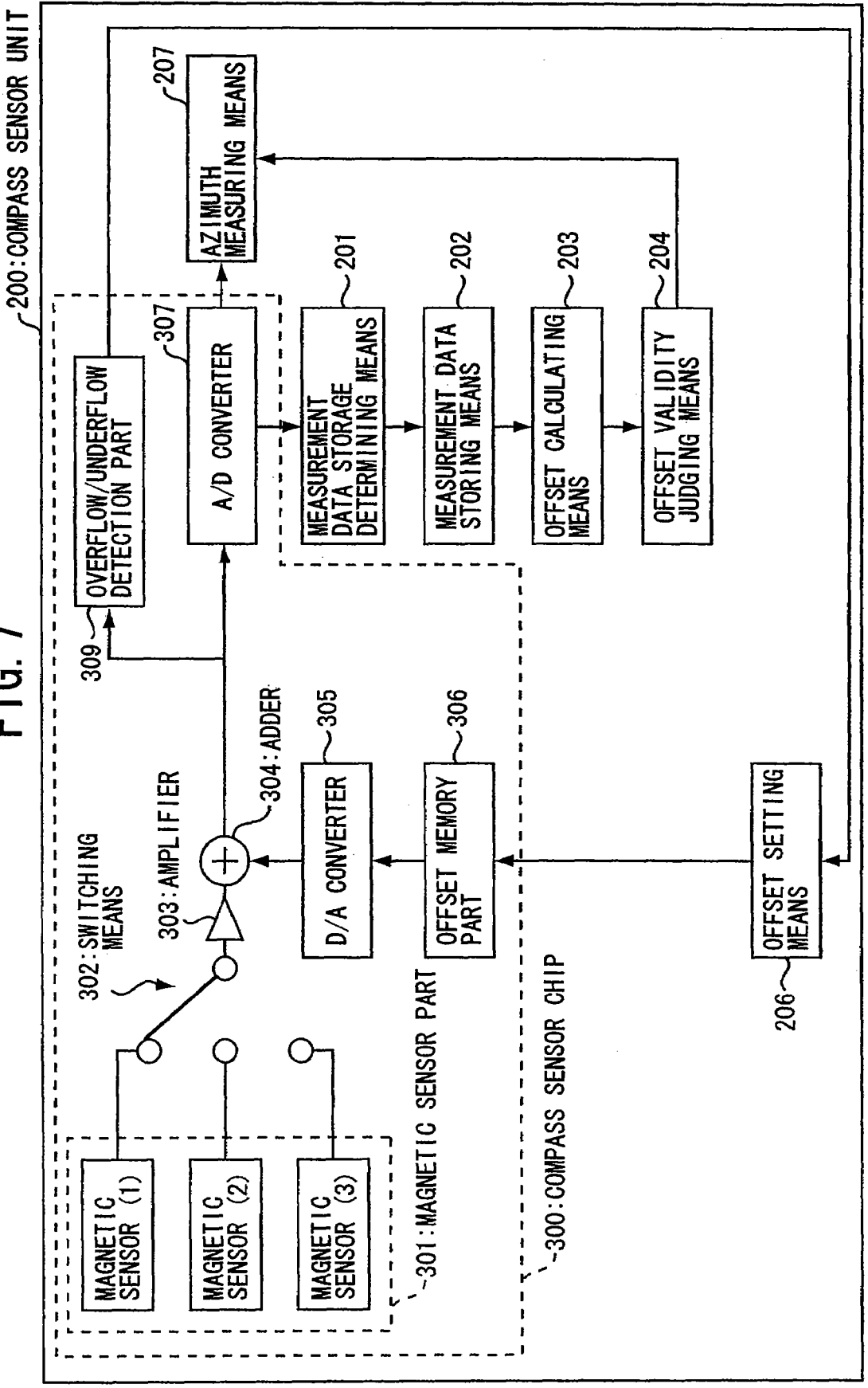
FIG. 7 is a block diagram showing the structure of a modification example of the compass sensor unit according to the second embodiment.

FIG. 7 is a modification example of the embodiment, in which the offset storing means 205 is eliminated, so that the offset setting means 206 makes a correction to compensate for overflow or underflow, and the offset of the measurement data that is within the input range of the A/D converter 307 is corrected based on the offset value calculated by the offset calculating means 203. In such a structure, an overflow/underflow correction is made primarily through hardware processing, while a correction after elimination of overflow or underflow is made primarily through software processing. This makes it possible to reduce not only the circuit load but also the software processing load.

According to the embodiment, the overflow/underflow detection part detects overflow or underflow. When the overflow or underflow is detected, the adder 304 corrects the measurement data based on the value of the overflow/underflow detection. This makes it possible to reduce time required for A/D conversion by the A/D converter 307, and hence to calculate an accurate azimuth direction in a short time. Further, if consideration is given to the circuit structure, the circuit load and the software processing load can be reduced as well.

A third embodiment will next be described using FIGS. 8 and 9.

Figure 8:
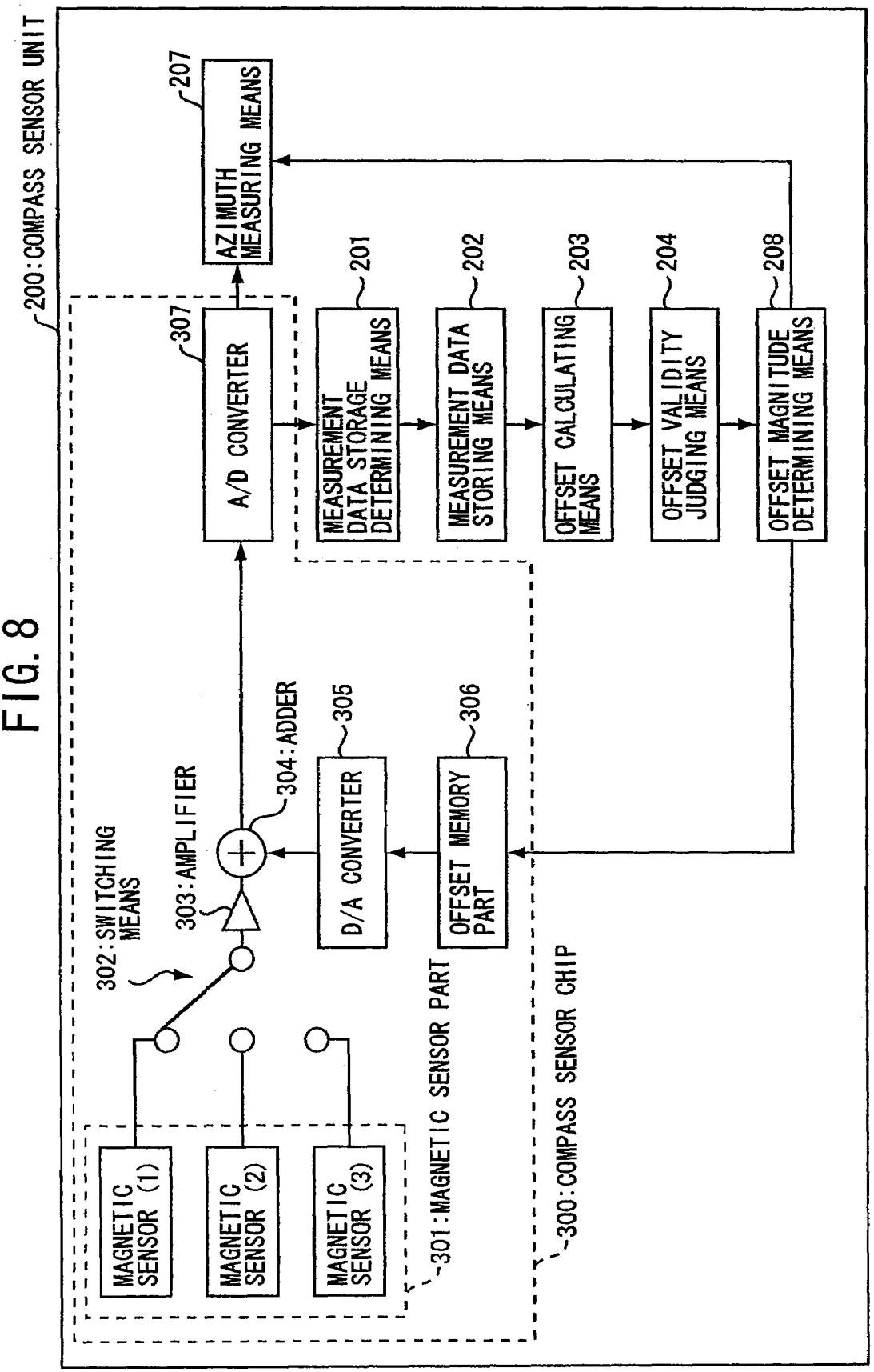
FIG. 8 is a block diagram showing the structure of a compass sensor unit according to a third embodiment.

As shown in FIG. 8, a compass sensor unit according to the third embodiment includes offset magnitude determining means 208 instead of the offset setting means 206 and the offset storing means 205 provided in the first embodiment.

The offset magnitude determining means 208 determines whether the offset value judged to be valid is lager than a given value. When the offset value is larger than the given value, it is output to the offset memory part 306, while when the offset value is smaller than the given value, it is output to the azimuth measuring means 207.

Next, specific processing will be described using FIG. 9.

Figure 9:
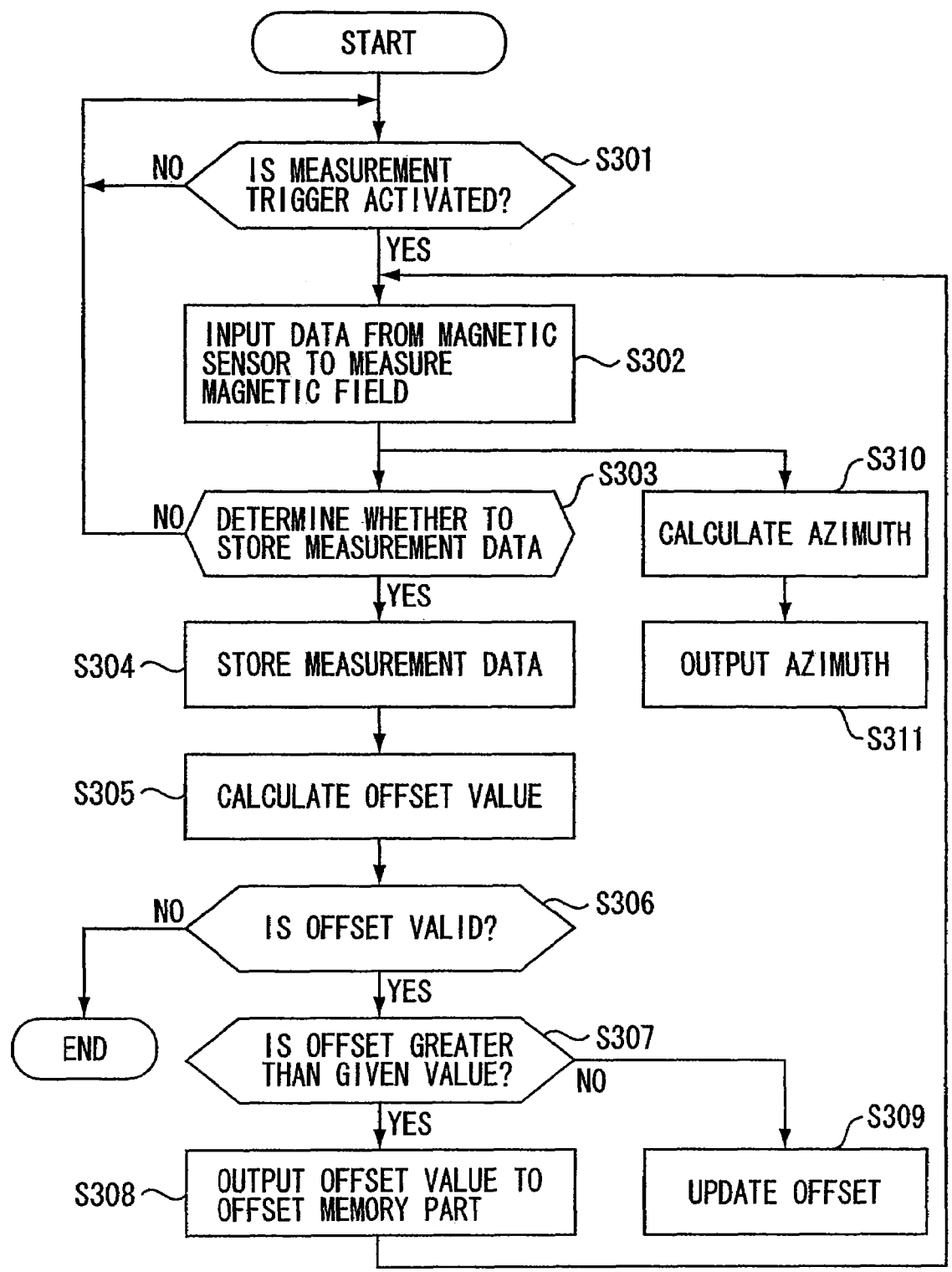
FIG. 9 is a flowchart related to output of azimuth data according to the third embodiment.

As shown in FIG. 9, for example, when an application program or the like requiring azimuth measurement is activated, the compass sensor unit 200 is triggered to perform measurement (step 301) in the same manner as in the first embodiment. When the measurement trigger is activated, magnetic field is measured from data input from the magnetic sensor part 301, converted to digital measurement data, and output to the measurement data storage determining means 201 and the azimuth measuring means 207 (step 302).

The measurement data storage determining means 201 performs processing for determining whether to store the data in the measurement data storing means 202 (step 303). When the measurement data is determined to be stored, it is stored in the measurement data storing means 202 (step 304), while when it is determined to be not stored, the procedure returns to step 301.

The measurement data storing means 202 captures the data from the measurement data storage determining means 201, stores it based on a storage method to be described later (step 304), and inquires of offset calculation triggering means, not shown, as to whether the data should be output to the offset calculating means 203. The offset calculation triggering means replies as to whether the data should be output to the offset calculating means 203 based on the above-mentioned triggering method. When receiving an instruction to output data to the offset calculating means 203, the measurement data storing means 202 outputs the stored data to the offset calculating means 203.

Upon receiving the input of the measurement data from the measurement data storing means 202, the offset calculating means 203 calculates offset according to the above-mentioned offset calculation algorithm (step 305). After the offset value is calculated, the offset validity judging means 204 judges the validity of the offset value (step 306).

Then, it is determined whether the offset value judged to be valid is larger than the predetermined value (step 307). When the offset value is larger than the predetermined value, it is output to the offset memory part 306 (step 308), while when the offset value is smaller than the predetermined value, it is output to the azimuth measuring means 207. Then, the offset value stored in storage means, not shown, in the azimuth measuring means 207 is updated (step 309).

On the other hand, the azimuth measuring means 207 removes the offset from the input measurement data after step 302, and calculates an azimuth direction based on the data (step 310). The azimuth data thus obtained is output, for example, to the display part 117 of the portable terminal, and displayed on it (step 311).

According to the embodiment, the offset magnitude determining means detects the magnitude of the offset after the offset validity judging means has judged valid. When the detected magnitude is greater than the predetermined reference value, the offset value is outputted to the offset memory part 306. The outputted offset value and the previous offset value in the offset memory part 306 are summed with each other. The summed offset value is converted into an analog signal by the D/A converter 305. The adder 304 subtracts the converted analog signal from the measurement signal. This makes it possible to reduce time required for A/D conversion by the A/D converter 307, and hence to calculate an accurate azimuth direction in a short time. Further, if consideration is given to the circuit structure, the circuit load and the software processing load can be reduced as well.

A fourth embodiment will next be described using FIGS. 10 to 12.

Figure 10:
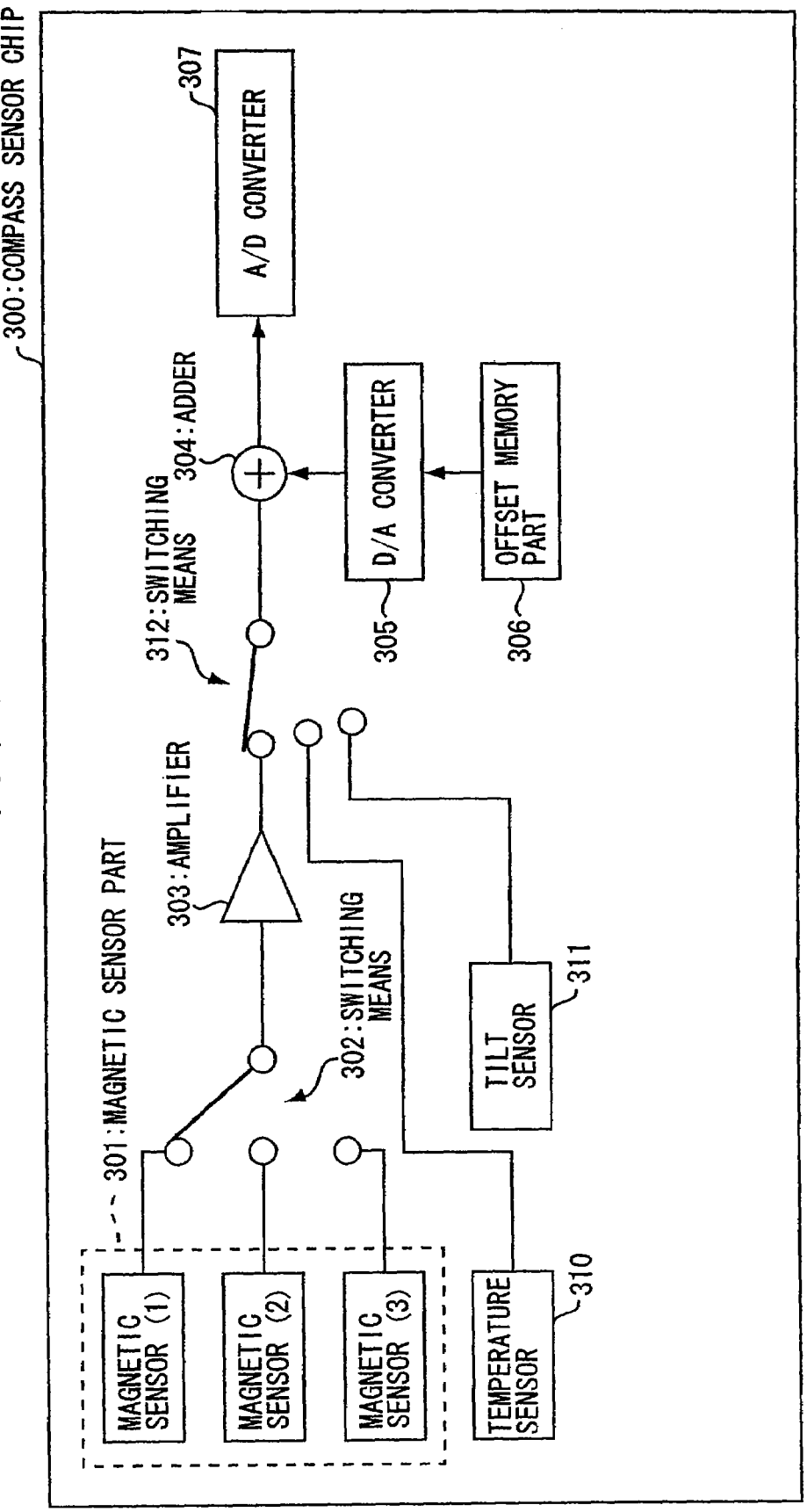
FIG. 10 is a block diagram showing the structure of a compass sensor chip according to a fourth embodiment.
Figure 11:
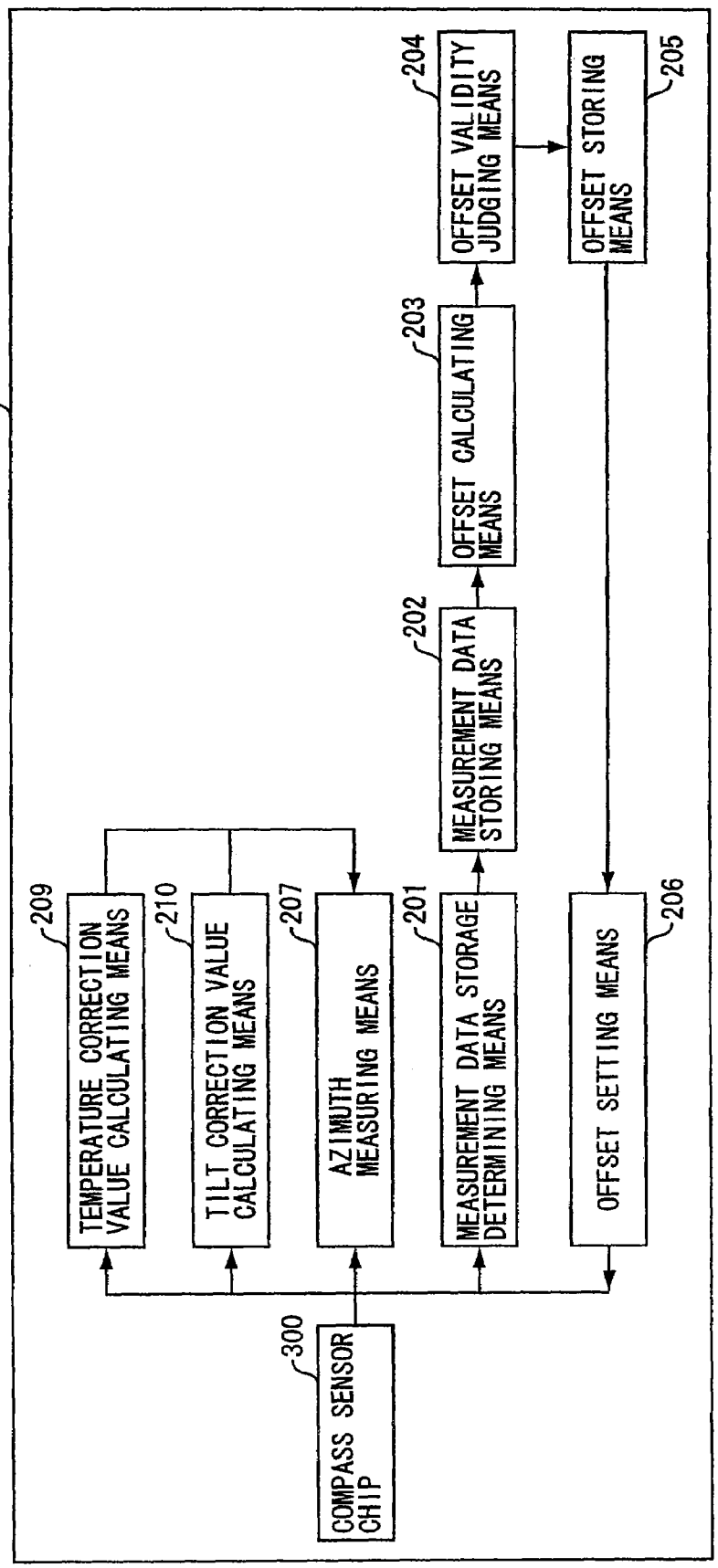
FIG. 11 is a block diagram showing the structure of a compass sensor unit according to the fourth embodiment.

As shown in FIG. 10, a compass sensor chip 300 according to the fourth embodiment further includes, in addition to the components in the first embodiment, a temperature sensor 310, a tilt sensor 311, and switching means 312 for switching among the output of the amplifier 303, the output of the temperature sensor 310, and the output of the tilt sensor 311. In addition, as shown in FIG. 11, the compass sensor unit 200 further includes temperature correction value calculating means 209 and tilt correction value calculating means 210 for calculating a temperature correction value and a tilt correction value, respectively, when the input data is fed from the magnetic sensor part through the A/D converter 307 of the compass sensor chip 300.

The temperature sensor 310 monitors the temperature of the compass sensor chip 300, and outputs the data to the temperature correction value calculating means 209 of the compass sensor unit 200 through the A/D converter 307 of the compass sensor chip 300. The temperature correction value calculating means 209 prestores functions of temperatures and correction values, so that it outputs a correction value corresponding to the input temperature data to the azimuth measuring means 207. Specifically, if temperature upon calibration is TO, estimated offset is OF, a temperature coefficient is A (measured and stored in the ROM 109 at the time of shipping inspection), temperature upon measurement is T, and a value measured by each magnetic sensor is SO, magnetic data S1 after temperature-corrected offset is removed is given by:

$$S1 = S0 - \{OF + A(T - TO)\}.$$

In the above equation, A(T−TO) denotes the correction value for the inputted temperature data.

The tilt sensor 311 monitors the inclination of the compass sensor chip 300, and outputs the data to the tilt correction value calculating means 210 of the compass sensor unit 200 through the A/D converter 307 of the compass sensor chip 300. The tilt correction value calculating means 210 calculates elevation β and skew angle γ by a method to be described below, and outputs them to the azimuth measuring means 207.

The details of the tilt correction will be described by taking as an example the case of the portable terminal 1.

Figure 13A:
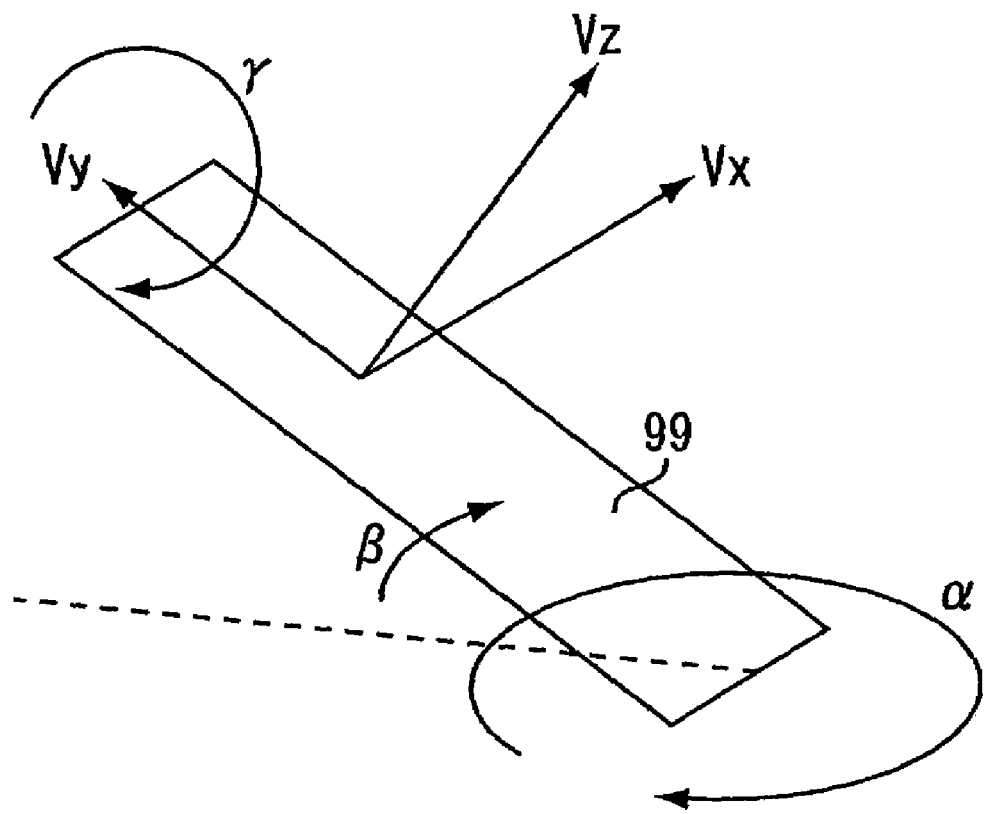
FIG. 13A is an illustration showing the coordinate system allocated to a portable terminal.
Figure 13B:
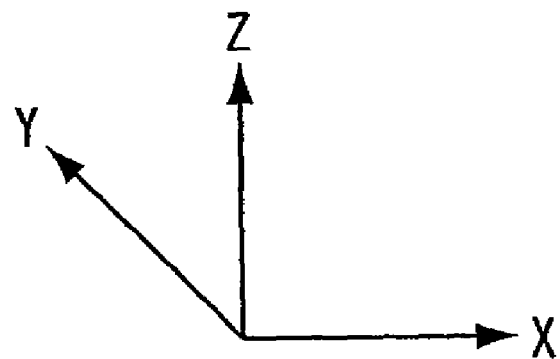
FIG. 13B is an illustration showing a ground coordinate system.

As shown in FIG. 13(a), the coordinate system of the portable terminal 1 is first defined. In other words, the azimuth of the antenna 101 of the portable terminal 1 is represented as α, the elevation as β, and the skew angle (rotating angle about the antenna axis) as γ. These symbols indicate positive in the direction of arrow. Further, a unit vector in the antenna direction is represented as Vy, a unit vector in a direction perpendicular to the surface (e.g., part 99 in FIG. 13) of a terminal unit-2 (the side on which the antenna 101 and the compass sensor ship 300 are arranged) is represented as Vz, and a unit vector orthogonal to both of Vy and Vz is represented as Vx. Note that the direction of arrow of each unit vector is positive. Then, as shown in FIG. 13(b), the coordinate system of the ground is represented by X, Y, and Z, with the Y axis heading north.

Here, gravity in the ground coordinate system is defined as G=(0, 0, Gz). Further, gravity in the portable-terminal coordinate system is defined as g=(gx, gy, gz). It is assumed here that the gravity in the portable-terminal coordinate system can be detected by the tilt sensor. It is needless to say that the gravity in the ground coordinate system is known.

Thus, the gravity g in the portable-terminal coordinate system and the gravity G in the ground coordinate system are represented by the following equation:

$$(Gx, Gy, Gz) BC = (gx, gy, gz),$$

where $$B = \begin{bmatrix} 1 & 0 & 0 \\ 0 & \cos\beta & \sin\beta \\ 0 & -\sin\beta & \cos\beta \end{bmatrix}$$

$$C = \begin{bmatrix} \cos\gamma & 0 & -\sin\gamma \\ 0 & 1 & 0 \\ \sin\gamma & 0 & \cos\gamma \end{bmatrix}$$

From these relations, BC is represented by the following equation:

$$BC = \begin{bmatrix} \cos\gamma & 0 & -\sin\gamma \\ \sin\beta\sin\gamma & \cos\beta & \sin\beta\cos\gamma \\ \cos\beta\sin\gamma & -\sin\beta & \cos\beta\cos\gamma \end{bmatrix}$$

Therefore, the gravity g in the portable-terminal coordinate system is represented by the following equation:

$$(gx, gy, gz) = (0, 0, Gz) \begin{bmatrix} \cos\gamma & 0 & -\sin\gamma \\ \sin\beta\sin\gamma & \cos\beta & \sin\beta\cos\gamma \\ \cos\beta\sin\gamma & -\sin\beta & \cos\beta\cos\gamma \end{bmatrix}$$

$$= Gz(\cos\beta\sin\gamma, -\sin\beta, \cos\beta\cos\gamma)$$

From this equation, the elevation β and the skew angle γ are determined as follows:

$$\beta = \arctan\left(-\frac{gy}{\sqrt{gx^2 + gz^2}}\right)$$

$$\gamma = \begin{cases} \arctan\left(\frac{gx}{gz}\right) & gz \geq 0 \\ 180(deg) + \arctan\left(\frac{gx}{gz}\right) & gz < 0 \end{cases}$$

Thus the elevation β and the skew angle γ can be determined.

When receiving the elevation β and the skew angle γ, the azimuth measuring means 207 determines the azimuth α and geomagnetic elevation θ according to an algorithm to be described below.

If geomagnetism in the portable-terminal coordinate system is h=(hx, hy, hz) and geomagnetism in the ground coordinate system is H=(0, Hy, Hz), the following equation is given:

$$(0, Hy, Hz) ABC = (hx, hy, hz),$$

where $$A = \begin{bmatrix} \cos\alpha & -\sin\alpha & 0 \\ \sin\alpha & \cos\alpha & 0 \\ 0 & 0 & 1 \end{bmatrix}$$

$$B = \begin{bmatrix} 1 & 0 & 0 \\ 0 & \cos\beta & \sin\beta \\ 0 & -\sin\beta & \cos\beta \end{bmatrix}$$

$$C = \begin{bmatrix} \cos\gamma & 0 & -\sin\gamma \\ 0 & 1 & 0 \\ \sin\gamma & 0 & \cos\gamma \end{bmatrix}$$

From these relations, the following equation is derived:

$$(0, Hy, Hz)A = (hx, hy, hz)C^{-1}B^{-1} = (hx', hy', hz')$$

and hence (hx', hy', hz')=(Hysinα, Hycosα, Hz). Therefore, (hx', hy', hz') can be defined based on the input elevation β, the input skew angle γ, and the measured geomagnetism h in the portable-terminal coordinate system. Here, since the geomagnetism H in the ground coordinate system is known, the azimuth α is determined. The geomagnetic elevation θ is also determined by the following equation:

$$\theta = \arctan \frac{hz'}{\sqrt{hx'^2 + hy'^2}}$$

Thus, according to the embodiment, not only the effect of offset of each magnetic sensor caused by changes in magnetic fields of peripheral parts and the like but also the effect of offset caused by changes in temperature and inclination can be removed effectively.

Figure 12:
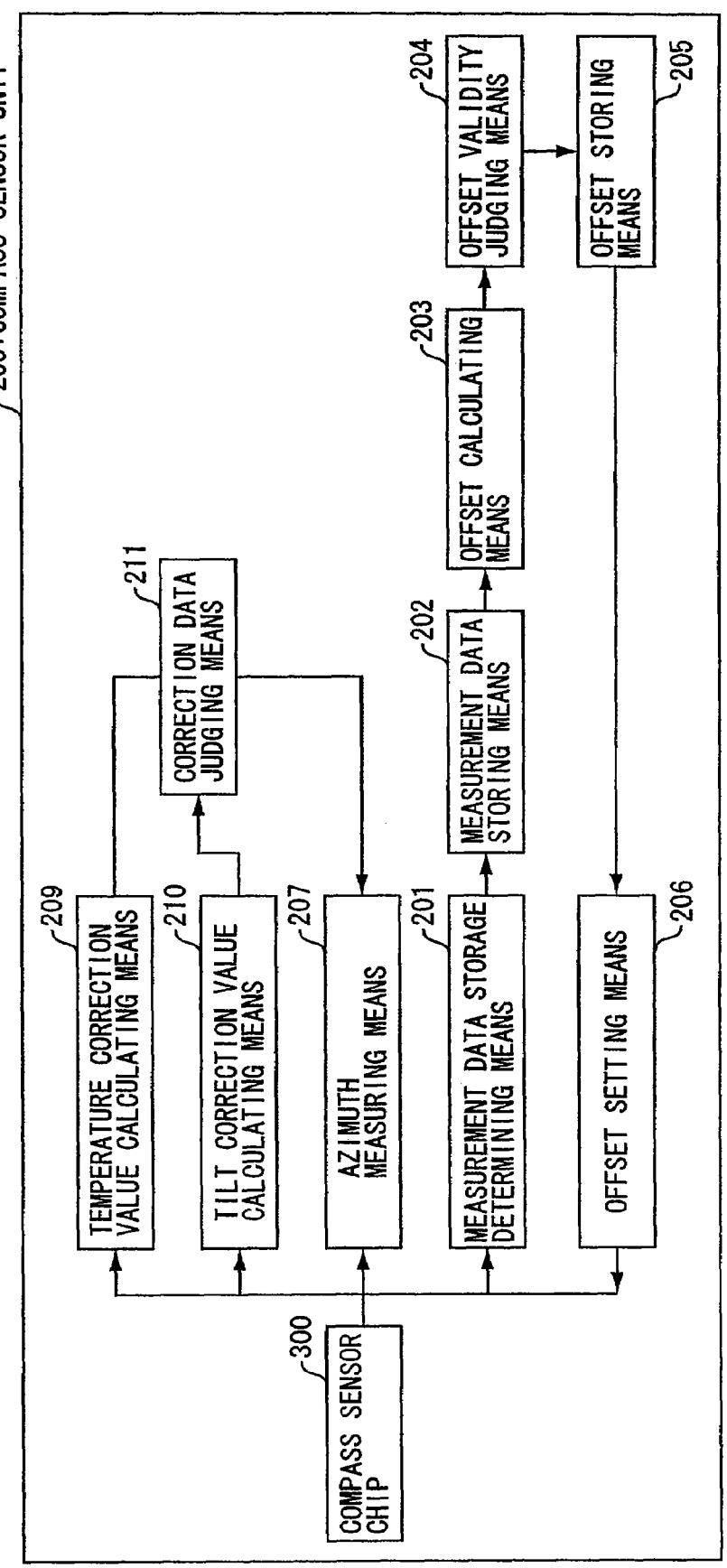
FIG. 12 is a block diagram showing the structure of a modification example of the compass sensor unit according to the fourth embodiment.

FIG. 12 is a modification example of the embodiment, in which correction data judging means 211 is provided to the outputs of the temperature correction value calculating means 209 and the tilt correction value calculating means 210. The correction data judging means 211 having storage means, not shown, compares output data from each of the temperature correction value calculating means 209 and the tilt correction value calculating means 210 with the last stored output data. Then, when the output data contains a given degree or more change, the data is output to the azimuth measuring means 207.

Thus, according to the embodiment, the correction data judging means 211 judges the data from the temperature correction value calculating means 209 and the tilt correction value calculating means 210 to determine whether to output the data to the azimuth measuring means 207. This can reduce the processing load on the azimuth measuring means 207.

The above describes the embodiments of the present invention with reference to the accompanying drawings, but specific structures are not limited to those of the embodiments, and any other structures can be included without departing from the scope of the invention. For example, the block for calculating the outputs of the magnetic sensors is provided in the compass sensor unit in the embodiments of the present invention, but it is not limited to such an arrangement, and the calculation part may be provided in the main control part of the terminal unit.

The present invention has the advantage of being able to perform calibration without putting an excess load on the user so as to output an accurate direction.

It also has the advantage of providing a compass sensor unit capable of outputting an accurate direction while reducing the loads on the D/A converter and memory.

What is claimed is:

1. An azimuth data computing method comprising the steps of:
   inputting a signal from a geomagnetic sensor to measure a magnetic field which may be mixture of a geomagnetic field and other magnetic field causing a varying offset, thereby successively providing measurement data of the magnetic field;
   storing the measurement data successively measured from the input signal of the geomagnetic sensor in a storage;
   periodically calculating an offset value representative of the varying offset at a given time interval based on a plurality of the measurement data stored in the storage, such that a new offset value of the varying offset is calculated at the given time interval after a previous offset value of the varying offset has been calculated;
   updating the previous offset value based on the new offset value; and
   correcting the measurement data which is provided after the previous offset value has been updated, according to the updated offset value and computing azimuth data according to the corrected measurement data.

2. An azimuth data computing method comprising the steps of:
   inputting a signal from a geomagnetic sensor to measure a magnetic field which may be mixture of a geomagnetic field and other magnetic field causing a varying offset, thereby successively providing measurement data of the magnetic field;
   storing the measurement data successively measured from the input signal of the geomagnetic sensor in a storage;
   commencing a current offset calculation when a predetermined time has passed from a previous offset calculation and when a number of the measurement data stored in the storage reaches a predetermined number for calculating a new offset value representative of the varying offset; updating a previous offset value which has been calculated in the previous offset calculation, based on the new offset value which is calculated in the current offset calculation; and
   correcting the measurement data which is provided after the previous offset value has been updated, according to the updated offset value and computing azimuth data according to the corrected measurement data.

3. A compass sensor unit having a geomagnetic sensor comprising:
   a magnetic field measuring section that inputs a signal from the geomagnetic sensor to measure a magnetic field which may be mixture of a geomagnetic field and other magnetic field causing a varying offset, thereby successively providing measurement data of the magnetic field;
   a measurement data storing section that has a storage and that stores the measurement data successively measured from the input signal of the geomagnetic sensor in the storage;
   an offset calculating section that periodically calculates an offset value representative of the varying offset at a given time interval based on a plurality of the measurement data stored in the storage, such that a new offset value of the varying offset is calculated at the given time interval after a previous offset value of the varying offset has been calculated;

an offset setting section that updates the previous offset value based on the new offset value;

a computing section that removes the offset value updated by the offset setting section from the measurement data which is provided after the previous offset value has been updated, to compute corrected measurement data; and an azimuth measuring section that computes azimuth data according to the corrected measurement data.

4. A compass sensor unit having a geomagnetic sensor comprising:

a magnetic field measuring section that inputs a signal from the geomagnetic sensor to measure a magnetic field which may be mixture of a geomagnetic field and other magnetic field causing a varying offset, thereby successively providing measurement data of the magnetic field;

a measurement data storing section that has a storage and that stores the measurement data successively measured from the input signal of the geomagnetic sensor in the storage;

an offset calculating section that commences a current offset calculation when a predetermined time has passed from a previous offset calculation and when a number of the measurement data stored in the storage reaches a predetermined number for calculating a new offset value representative of the varying offset;

an offset setting section that updates a previous offset value which has been calculated in the previous offset calculation, based on the new offset value which is calculated in the current offset calculation;

a computing section that removes the offset value updated by the offset setting section from the measurement data which is provided after the previous offset value has been updated, to compute corrected measurement data; and an azimuth measuring section that computes azimuth data according to the corrected measurement data.

5. A recording medium for use in an electronic apparatus having a processor, a storage and a geomagnetic sensor, the recording medium containing program instructions executable by the processor for causing the electronic apparatus to perform a method of computing azimuth data comprising the steps of:

inputting a signal from the geomagnetic sensor to measure a magnetic field which may be mixture of a geomagnetic field and other magnetic field causing a varying offset, thereby successively providing measurement data of the magnetic field;

storing the measurement data successively measured from the input signal of the geomagnetic sensor in the storage;

periodically calculating an offset value representative of the varying offset at a given time interval based on a plurality of the measurement data stored in the storage, such that a new offset value of the varying offset is calculated at the given time interval after a previous offset value of the varying offset has been calculated;

updating the previous offset value based on the new offset value; and correcting the measurement data which is provided after the previous offset value has been updated, according to the updated offset value and computing the azimuth data according to the corrected measurement data.

6. A recording medium for use in an electronic apparatus having a processor, a storage and a geomagnetic sensor, the recording medium containing program instructions executable by the processor for causing the electronic apparatus to perform a method of computing azimuth data comprising the steps of:

inputting a signal from the geomagnetic sensor to measure a magnetic field which may be mixture of a geomagnetic field and other magnetic field causing a varying offset, thereby successively providing measurement data of the magnetic field;

storing the measurement data successively measured from the input signal of the geomagnetic sensor in the storage;

commencing a current offset calculation when a predetermined time has passed from a previous offset calculation and when a number of the measurement data stored in the storage reaches a predetermined number for calculating a new offset value representative of the varying offset;

updating a previous offset value which has been calculated in the previous offset calculation, based on the new offset value which is calculated in the current offset calculation; and correcting the measurement data which is provided after the previous offset value has been updated, according to the updated offset value and computing the azimuth data according to the corrected measurement data.

* * * * *